United States Patent [19]

Haraguchi et al.

[11] Patent Number: 4,513,716
[45] Date of Patent: Apr. 30, 1985

[54] IGNITION TIMING CONTROL SYSTEM WITH KNOCK CONTROL FOR INTERNAL COMBUSTION ENGINES

[75] Inventors: Hiroshi Haraguchi, Oobu; Ko Narita; Toshiharu Iwata, both of Aichi, all of Japan

[73] Assignee: Nippondenso Co., Ltd., Kariya, Japan

[21] Appl. No.: 445,543

[22] Filed: Nov. 30, 1982

[30] Foreign Application Priority Data

Dec. 2, 1981 [JP] Japan .................. 56-194824
Dec. 3, 1981 [JP] Japan .................. 56-195142

[51] Int. Cl.³ ............................................. F02P 5/04
[52] U.S. Cl. ................................... 123/425; 123/422; 123/427
[58] Field of Search ............... 123/425, 422, 417, 416, 123/435, 415, 427

[56] References Cited

U.S. PATENT DOCUMENTS

| | | | |
|---|---|---|---|
| 4,002,155 | 1/1977 | Harned et al. | 123/425 |
| 4,061,116 | 12/1977 | Saida et al. | 123/416 |
| 4,120,272 | 10/1978 | Douaud et al. | 123/425 |
| 4,328,779 | 5/1982 | Hattori et al. | 123/425 |
| 4,337,744 | 7/1982 | Seeger et al. | 123/422 |
| 4,344,400 | 8/1982 | Asano | 123/425 |
| 4,367,531 | 1/1983 | Furuhashi et al. | 123/425 |
| 4,370,963 | 2/1983 | Iwata et al. | 123/425 |
| 4,428,343 | 1/1984 | Schweikert et al. | 123/425 |

Primary Examiner—Andrew M. Dolinar
Attorney, Agent, or Firm—Cushman, Darby & Cushman

[57] ABSTRACT

An internal combustion engine ignition timing control system with knock control detects the knocking in an engine and the acceleration of the engine speed to control the ignition timing of the engine. The ignition timing of the engine is retarded in response to the detection of knocking in the engine and the amount of retard is increased as compared with the amount of retard provided under the steady-state condition when the knocking occurs during the acceleration operation of the engine and the frequency of occurrence of knocking is high.

18 Claims, 58 Drawing Figures (a)

(b)

(c)

(a)

(b)

IGNITION TIMING CONTROL SYSTEM WITH KNOCK CONTROL FOR INTERNAL COMBUSTION ENGINES

BACKGROUND OF THE INVENTION

The present invention relates to an internal combustion engine ignition timing control system with knock control which functions such that the occurrence of knocking is detected from the vibrations or sound produced outside the engine cylinders due to the cylinder pressure and the ignition timing of the engine is retarded in accordance with the detected knocking.

Recently, a variety of so-called knock feedback systems have been under study in which the ignition timing of an engine is retarded by detecting the occurrence of knocking in the engine. These systems are generally designed as follows. In other words, the vibrations or sound produced outside the engine cylinders due to the cylinder pressure is detected so that when the vibrations or sound exceeds a preset level (a knocking determination level), the occurrence of knocking is determined and a knock signal is generated. The ignition timing is retarded when the knock signal is generated and the ignition timing is advanced when there is no knock signal, thereby always controlling the ignition timing at around the knock limiting value and improving the fuel consumption and power output performance of the engine.

In this type of knock feedback system, the degrees of crank angle at the ignition is retarded upon detection of knocking or the amount of ignition timing retard per knocking is preliminarily determined and it is usually on the order of 1° crank angle. This amount of retard per knocking event is the most important factor associated with the control performance of the ignition timing. This amount of retard will now be described with reference to FIG. 1. In FIG. 1, (a) and (b) show the ignition timing variations during the steady-state operation and (c) shows the ignition timing response characteristic during the transitional period. In each of (a) to (c) of FIG. 1, the abscissa represents the time and the ordinate represents the ignition timing.

In the Figure, (a) shows the ignition timing variation during the steady-state operation where the amount of retard per knocking event is large (e.g., 2° crank angle), and (b) shows the ignition timing variation during the steady-state operation where the amount of retard per knocking event is small (e.g., 0.5° crank angle). In each of (a) and (b), the dot-and-dash line indicates the desired ignition timing for the ignition timing control and it usually corresponds to the trace knock limit ignition timing. This ignition timing maintains the engine at the proper level of knocking and improves the fuel consumption. A glance at a comparison between (a) and (b) clearly shows that the control performance during the steady-state operation is better when the amount of retard per knocking is small ((b) of FIG. 1) than when it is large. The reason is that the deviation from the desired ignition timing increases when the amount of retard is large ((a) of FIG. 2) so that the knocking sound increases when the ignition timing deviation is on the advance side and loss occurs in the power output and fuel consumption when the timing deviation is on the retard side. Of course, if the amount of retard per knocking is reduced excessively, the knocking sound suppressing effect is deteriorated and thus the amount of retard during the steady-state operation should preferably be in the range of 0.3° to 0.5° crank angle. As just described, during the steady-state operation the ignition timing control performance is improved with a decrease in the amount of retard per knocking event.

However, the reverse can be said to be true in the case of the ignition timing response characteristic during the transitional period. In (c) of FIG. 1 showing the ignition timing response characteristic during the transitional period (rapid acceleration period), $r_1$ designates a case where the amount of retard is small (e.g., 0.5° crank angle) and $r_2$ a case where the amount of retard is large (e.g., 2° crank angle). It will be seen from the Figure that where the amount of retard per knocking event is small (i.e., the case 1), the ignition timing response characteristic is deteriorated and thus knocking occurs continuously during the transitional period, e.g., the rapid acceleration period thereby causing a feeling of unpleasantness on the part of the driver and causing damage to the engine. Therefore, the amount of retard per knocking event must be increased during the transional period. It will thus be seen that in order to improve both the ignition timing control performance during the steady-state period and the ignition timing response characteristic during the transitional period, it is absolutely necessary to distinguish between the steady-state period and the transitional period and changes over the amount of retard per knocking event from one value to another.

In the past, however, there has been no means capable of accurately distinguishing between the steady-state period and the transitional period and it has been impossible to change over the amount of retard per knocking event between the two values. For instance, in the case of a method which detects the acceleration operation of an engine and changes over the amount of retard correspondingly, there is a case where only slight knocking occurs even during the acceleration operation depending on the variations in characteristics among different engines, the surrounding conditions, etc., and in such case the large preset amount of retard frequently results in an excessively large retard angle thereby deteriorating the acceleration performance. As a result, the conventional preset amount of retard (e.g., 1° crank angle) has represented a compromise between those for the steady-state and transitional periods and the engine performance has been unavoidably deteriorated during both the steady-state period and the transitional period.

SUMMARY OF THE INVENTION

With a view to overcoming the foregoing deficiencies in the prior art, it is a first object of the invention to provide an ignition timing control system with knock control for internal combustion engines which is so designed that when acceleration detecting means detects the acceleration condition and knock signals are generated successively in a relatively short given period of time from a knock detecting circuit, it is determined immediately that the engine is at the transitional condition and the amount of retard per knocking event is increased thereby improving the transitional operating performance, whereas when no acceleration condition is detected or when the detection of the acceleration condition is not accompanied with the successive generation of knock signals during the period, it is determined that the engine is at the steady-state operation or at a light transitional condition and the amount of retard per knocking event is maintained at a relatively small value thereby improving the steady-state operating performance.

This is based on the fact that while, during the steady-state operation, the frequency of occurrence of knocking is relatively small during the steady-state operation where the ignition timing is controlled by a knock feedback system and thus the knock is produced at intervals of a relatively long period of time, during the transitional period, e.g., the acceleration period the knocking occurs at intervals of about 1 to 3 cycles and thus the interval of occurrence of the knocking events is reduced.

Even during the steady-state period, however, there are cases where the knocking occurs at intervals of a short period of time and in such cases it is necessary to detect an acceleration signal and reflect it in the control; otherwise large retards will be mingled as shown in (b) of FIG. 2 thereby degrading the steady-state performance. On the other hand, if only the acceleration signal is detected, the ignition timing is retarded greatly irrespective of the manner of occurrence of the knocking so that depending on the differences in characteristics among different engines, surrounding conditions, etc., such a large retard as shown at $r_4$ in (a) of FIG. 2 is provided even during an acceleration period where such a large retard is not required and thus the acceleration performance is deteriorated (essentially a retard angle as shown at $r_3$ in (a) of FIG. 2 is sufficient).

Thus, as in the case of this invention, by distinguishing between the steady-state period and the transitional period in accordance with both an acceleration signal and the interval of occurrence of knocking and changing over the amount of retard from one value to another, it is possible to overcome the foregoing deficiencies in the prior art and greatly improve the engine performance during both the steady-state and transitional periods than previously.

Also, during the steady-state period the interval of occurrence of knocking is varied in accordance with the operating conditions, and it is therefore a second object of the invention to provide such ignition timing control system so designed that a given time period for detecting the occurrence of successive knocking events is varied in accordance with the engine operating conditions, such as, the engine speed, intake pressure, etc., thereby accurately distinguishing between the steady-state period and the transitional period.

On the other hand, during a very low speed operation, such as, an operation at around the idling speed, it is required that the amount of retard be maintained at a small value from the standpoint of attaching importance to the power output for starting purposes, although the knocking sound is increased more or less during the transitional period. Also, at the high engine speeds greater than about 4,000 rpm mechanical noise tends to be applied to a knock sensor so that the occurrence of knocking is determined erroneously and knock pulses are generated successively in such a short period of time which is impossible to occur at the high speeds. Thus, it is a third object of the invention to provide such ignition timing control system so designed that the function of varying the amount of retard in accordance with the manner of occurrence of successive knocking events is essentially rendered invalid under such specified engine operating conditions.

DESCRIPTION OF THE PREFERRED EMBODIMENTS

The present invention will now be described in greater detail with reference to the illustrated embodiments.

Figure 1:
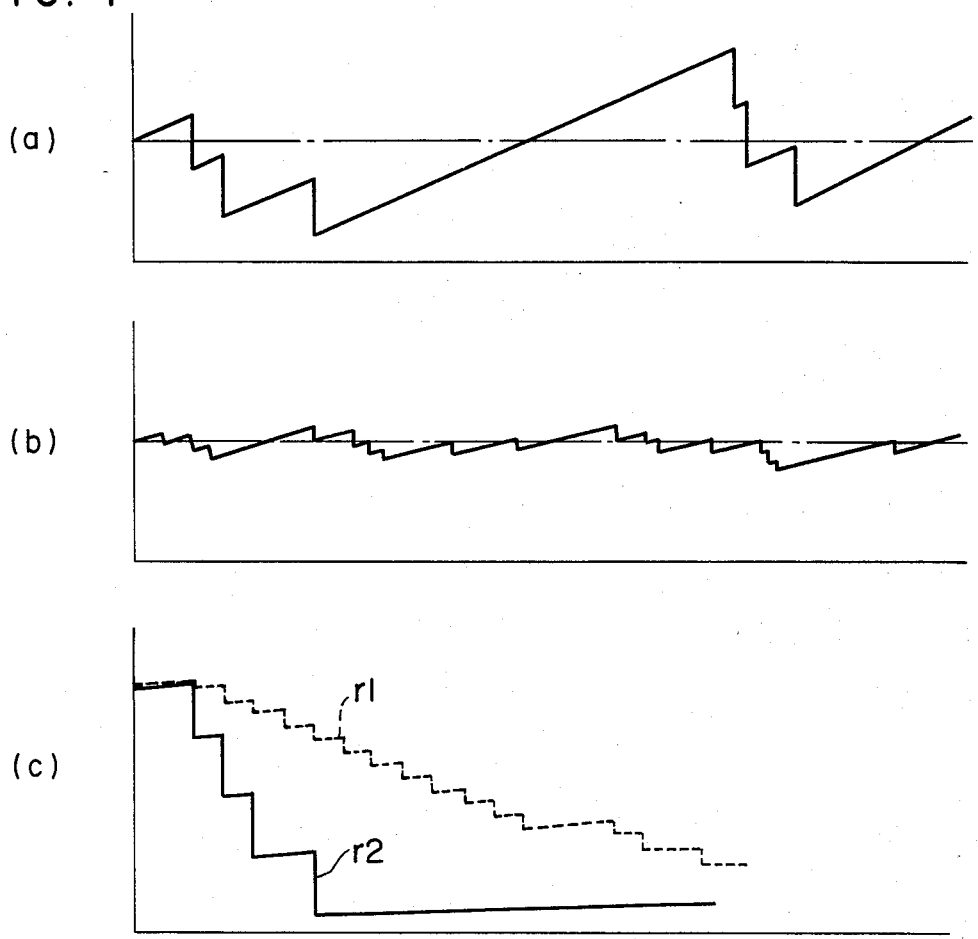
FIGS. 1(a–c) and 2(a, b) illustrate characteristic diagrams each showing the relationship between the ignition timing variation and the amount of retard.
Figure 2:
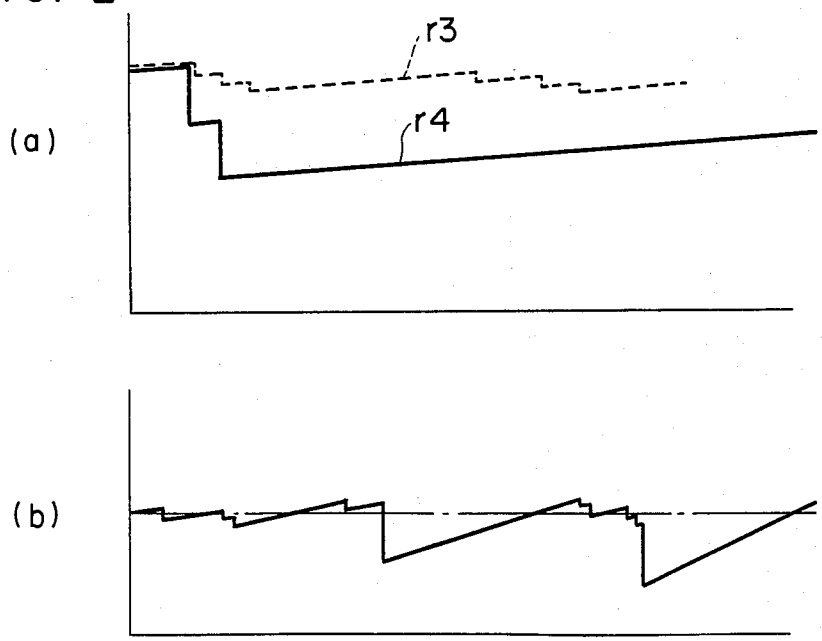
Figure 3:
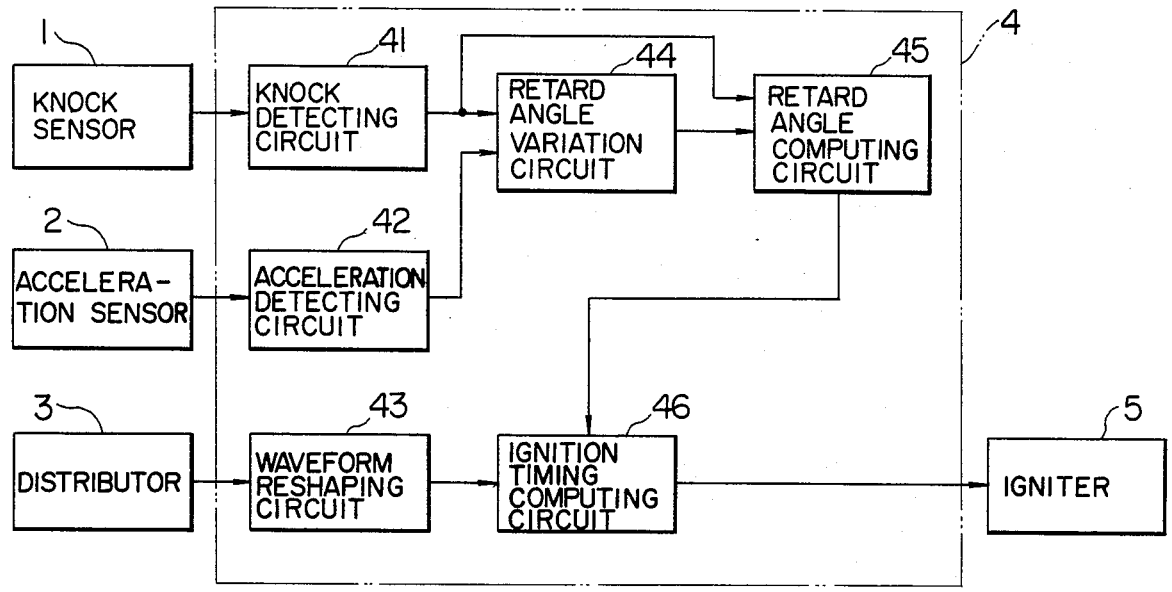
FIG. 3 is a block diagram showing the overall construction of a first embodiment of the present invention.

FIG. 3 is a block diagram showing a first embodiment of the invention. In the Figure, numeral 1 designates a knock sensor for detecting the vibrations in the body of an engine which are associated with an engine knocking phenomenon by using a piezoelectric method (a piezoelectric element), electromagnetic method (a magnet and a coil) or the like, 2 an acceleration sensor for detecting the engine throttle opening, intake negative pressure or speed associated with an acceleration phenomenon of the engine, 3 a contactless-type distributor for setting a basic ignition timing of the engine, 4 an ignition timing control circuit for receiving the signals from the knock sensor 1, the acceleration sensor 2 and the distributor 3 to determine the actual ignition timing and generate an ignition timing control signal, and 5 an igniter for power amplifying the ignition timing control signal to energize and deenergize an ignition coil (not shown). The construction of the ignition timing control circuit 4 is as follows. Numeral 41 designates a knock detecting circuit responsive to the output of the knock sensor 1 to detect whether the engine is knocking, 42 an acceleration detecting circuit responsive to the signal from the acceleration sensor 2 to detect the acceleration, 43 a waveform reshaping circuit for reshaping the pickup signal from the distributor 3 to derive a basic ignition timing, 44 a retard angle variation circuit responsive to the knock signals from the knock detecting circuit 41 to determine whether the engine is knocking continuously within a given period of time and vary the amount of retard per knocking event in accordance with the manner of occurrence of the knocking and the acceleration signal from the acceleration detecting circuit 42, 45 a retard angle computing circuit for computing the required retard angle from the basic ignition timing in response to the retard angle signal generated from the retard angle variation circuit 44 and corresponding to the amount of retard per knocking event and the knock signals generated from the knock detecting circuit 41, and 46 an ignition timing computing circuit for subtracting the retard angle generated from the retard angle computing circuit 45 from the basic ignition timing generated from the waveform reshaping circuit 43 to determine the actual ignition timing.

The construction of the knock detecting circuit 41 will now be described in greater detail with reference to FIG. 4. Numeral 411 designates a filter comprising a band-pass filter, high-pass filter or the like for separating and passing only the knocking frequency components of the output from the knock sensor 1, 412 a half-wave rectifier for half-wave rectifying the output from the filter 411, 413 an integrator for integrating the output of the half-wave rectifier 412 to derive the average value of the vibration output from the knock sensor 1, 414 an amplifier for amplifying the output of the integrator 413 to produce the proper knock determination level, 415 offset voltage setting means comprising a resistor, etc., for applying a voltage shift to the output of the amplifier 414 and produce such an effect as a noise margin, 416 an adder for combining the output of the amplifier 414 and the output of the offset voltage setting means 415 to produce the final knock discrimination level, 417 a comparator for comparing the output of the half-wave rectifier 412 with the output of the adder 416 so that when the output of the half-wave rectifier 412 is greater than the other, the occurrence of knocking is determined and an output voltage is generated, and 418 a monostable multivibrator which is triggered by the leading edge of the output from the comparator 417 to maintain its voltage signal for a given length of time from the triggering.

Figure 5:
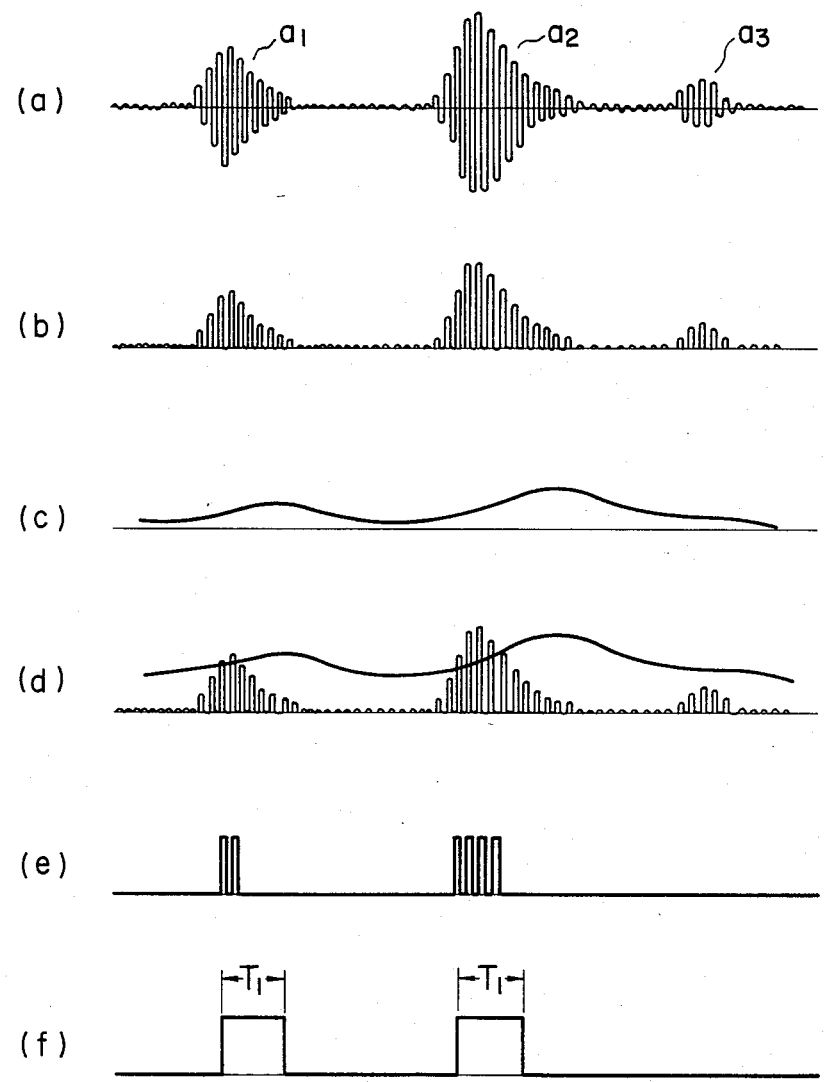
FIG. 5(a–f) illustrates a plurality of signal waveforms generated at various points in FIG. 4.

The operation of the knock detecting circuit 41 will now be described with reference to FIG. 5. In the Figure, (a) shows the output signal of the filter 411 and the signal represents only the knocking frequency components (6 to 9 kHz) selected and separated from the output of the knock sensor 1. In (a), $a_1$, $a_2$ and $a_3$ show the output corresponding to three different knocking conditions. More specifically, $a_1$ shows a relatively light knocking, $a_2$ a relatively heavy knocking and $a_3$ a very light knocking. Shown in (b) is the signal subjected to the half-wave rectification by the half-wave rectifier 412, and shown in (c) is the signal subjected to the integration and amplification by the integrator 413 and the amplifier 414. Shown in (d) is the signal obtained by adding the offset voltage from the offset voltage setting means 415 to the signal of (c) (or the knock discrimination level) and it is shown together with the output signal of the rectifier 412 (the waveform (b)) for comparison purposes. Shown in (e) is the output signal of the comparator 417 which goes to a high level when the output signal (the waveform (b)) of the rectifier 412 is higher than the knock discrimination level (the waveform (d)) and which goes to a low level when the former is lower than the latter. Shown in (f) is the output signal of the monostable multivibrator 418 which is triggered by the leading edge of the output signal (the waveform (s)) from the comparator 417 and goes to the high level for a given time $T_1$. In this way, when knocking occurs, a knock pulse is generated once for every combustion cycle irrespective of the intensity of the knocking.

Figure 6:
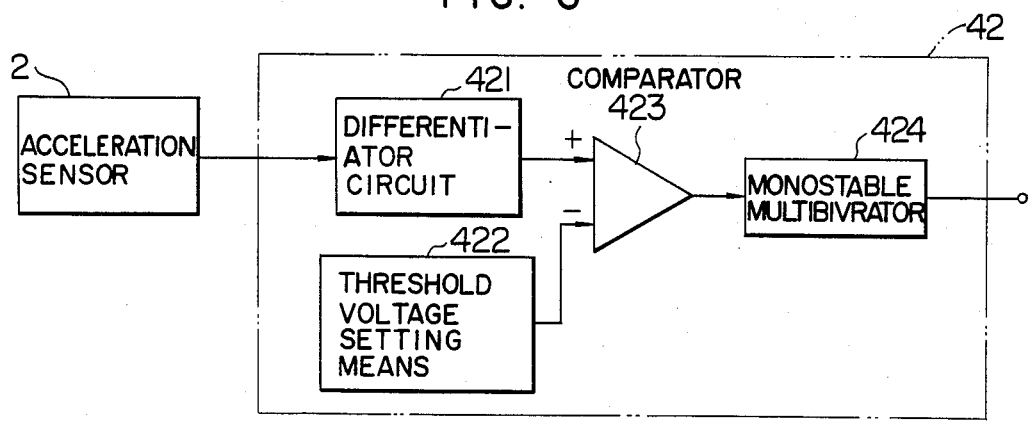
FIG. 6 is a block diagram showing in detail the construction of the acceleration detecting circuit shown in FIG. 3.

The operation and construction of the acceleration detecting circuit 42 will now be described. FIG. 6 shows an embodiment of the acceleration detecting circuit 42. In the Figure, the acceleration sensor 2 may be comprised of a throttle position sensor, a manifold pressure sensor, an engine speed sensor or the like. In the acceleration detecting circuit 42, numeral 421 designates a differentiator circuit for differentiating the output of the acceleration sensor 2, 422 a threshold voltage used to provide a threshold level for the output value of the differentiator circuit 421, 423 a comparator for comparing the output of the differentiator circuit 421 with the threshold voltage 422 so that an output signal is generated which goes to the high level when the output of the differentiator circuit 421 is higher than the other, and 424 a monostable multivibrator which is triggered by the leding edge of the signal from the comparator 423 to maintain its output signal at the high level for a given length of time.

Figure 7:
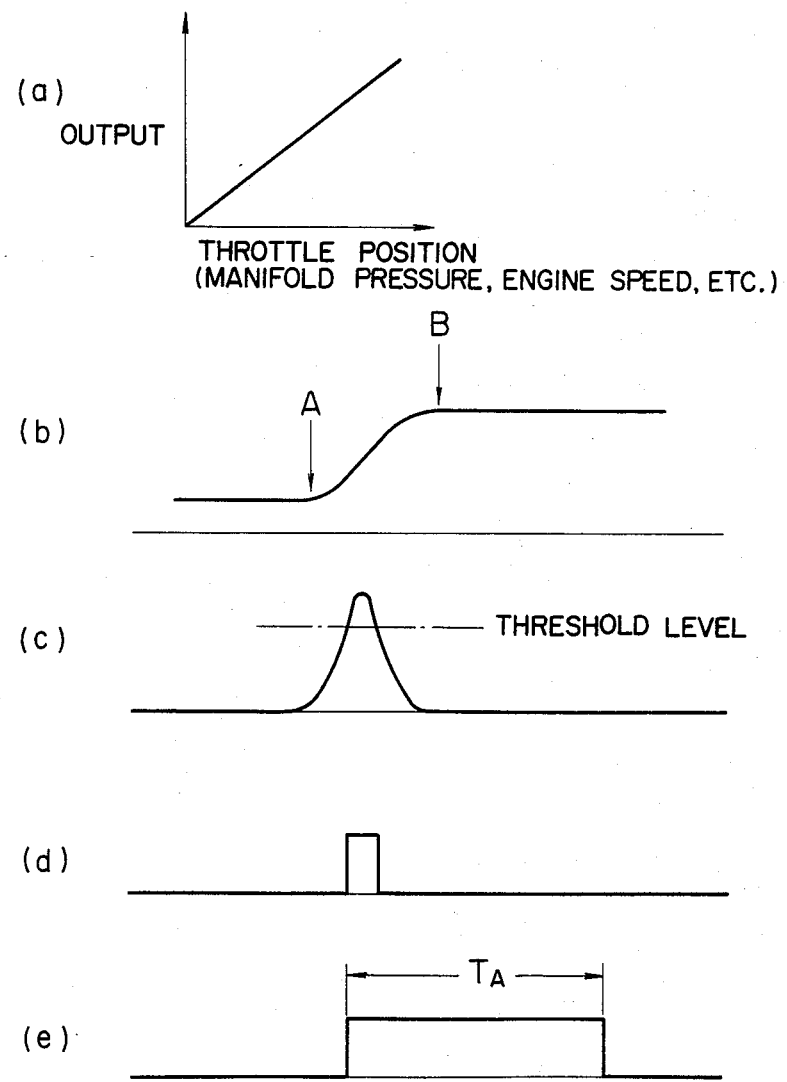
FIG. 7(a–e) illustrates a plurality of signal waveforms generated at various points in FIG. 6.

The operation of the acceleration detecting circuit 42 will now be described with reference to FIG. 7. In the Figure, (a) shows the output of the acceleration sensor 2. While, in this embodiment, the sensor 2 comprises a potentiometer-type throttle position sensor whose output increases with increase in the throttle opening, it may be comprised of a sensor for detecting the engine manifold pressure, engine speed or the like. Shown in (b) is the variation in the output of the acceleration sensor 2 when the engine comes into the acceleration operation. With the waveform (b), the arrow A indicates the starting point of the accelerator depression and the arrow B indicates the terminating point of the accelerator depression. Since the acceleration rate increases in proportion to the rate of change with time of the output from the acceleration sensor 2, the output (c) of the differentiator circuit 421 corresponds to the magnitude of the acceleration rate. The output of the differentiator circuit 421 is compared with the threshold level (shown by the dot-and-dash line in (c)) so that when the output exceeds the threshold level, it is determined that the engine has come into the acceleration operation and the comparator 423 generates a signal as shown in (d). The signal (d) is held at the high level for a given time $T_A$ by the monostable multivibrator 424. This is due to the fact that generally the occurrence of knocking upon acceleration is such that the knocking does not occur at the instant that the engine is accelerated but it occurs at the expiration of about 0.1 second after the acceleration and therefore the acceleration signal is maintained until such time.

Figure 8:
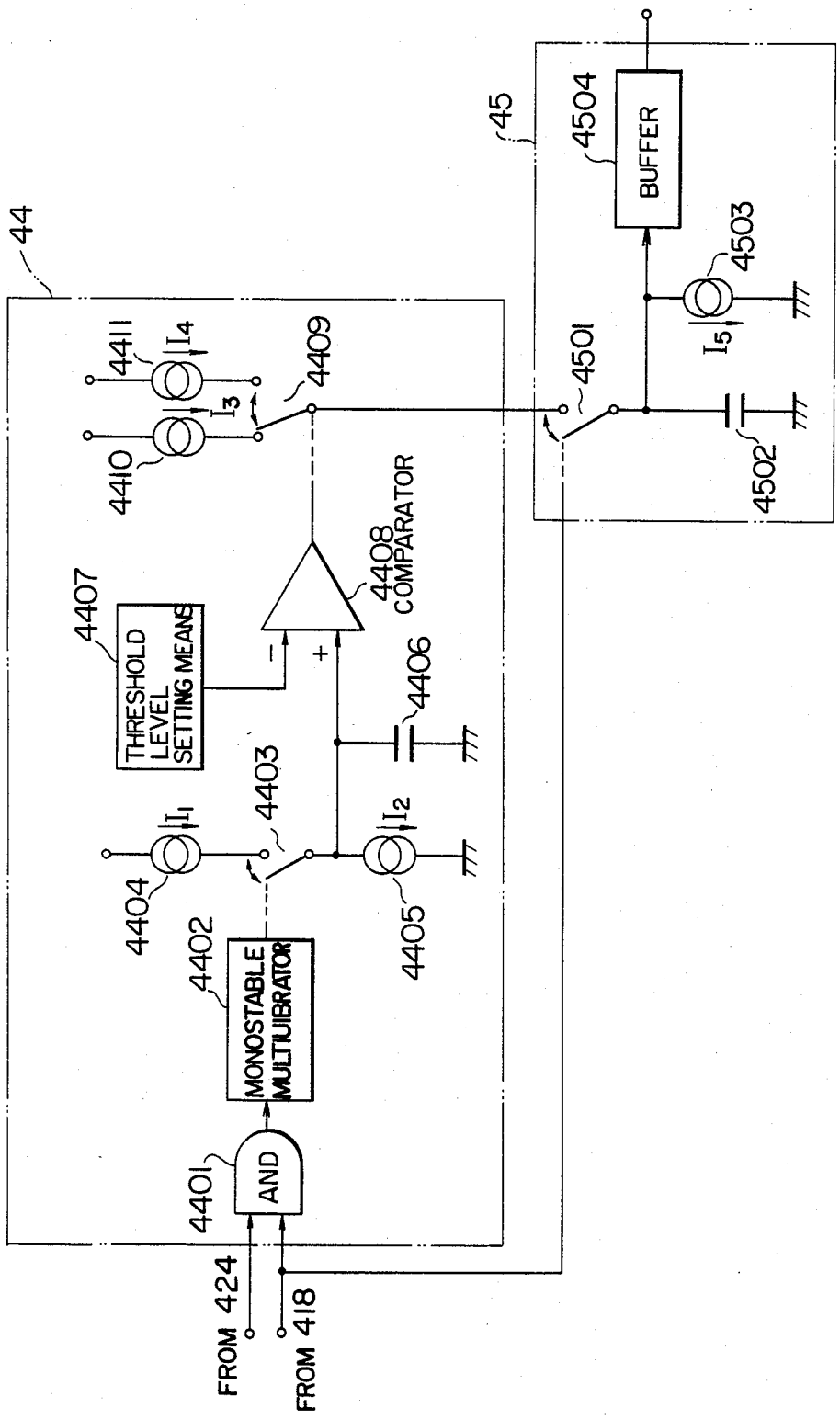
FIG. 8 is a block diagram showing in detail the construction of the retard angle variation circuit and the retard angle computing circuit shown in FIG. 3.

Next, the construction and operation of the retard angle variation circuit 44 and the retard angle computing circuit 45 which are the essential features of the invention will be described in detail with reference to the drawings. FIG. 8 shows in detail the construction of the retard angle variation circuit 44 and the retard angle computing circuit 45. In the Figure, numeral 4401 designates an AND circuit whose output goes to the high level when both of the outputs from the monostable multivibrators go to the high level, 4402 a monostable multivibrator which is triggered by the trailing edge of the output from the AND circuit 4401 to maintain its output at the high level for a given time $T_2$, 4403 a switch comprising a transistor or the like and adapted to be closed (turned on) during the time that the output of the monostable multivibrator 4402 is at the high level, 4404 a constant current source for supplying a constant current $I_1$, 4405 a constant current source for discharging a constant current $I_2$, 4406 a charging and discharging capacitor, 4407 threshold level setting means for setting a given threshold value, 4408 a comparator for comparing the voltage level of the capacitor 4406 and the voltage level of the threshold level setting means 4407 and generating a high-level output when the voltage level of the capacitor 4406 is higher the other, 4410 and 4411 constant current sources for respectively supplying constant currents $I_3$ and $I_4$, 4409 a switch for switching between the constant current sources 4410 and 4411 depending on whether the output of the comparator 4408 is at the high or low level, 4501 a switch adapted to be turned only during the time that a knock pulse is generated from the monostable multivibrator 418, 4503 a constant current source for discharging a constant current $I_5$, 4502 a charging and discharging capacitor, and 4504 a buffer for stably delivering the output voltage of the capacitor 452.

Figure 9:
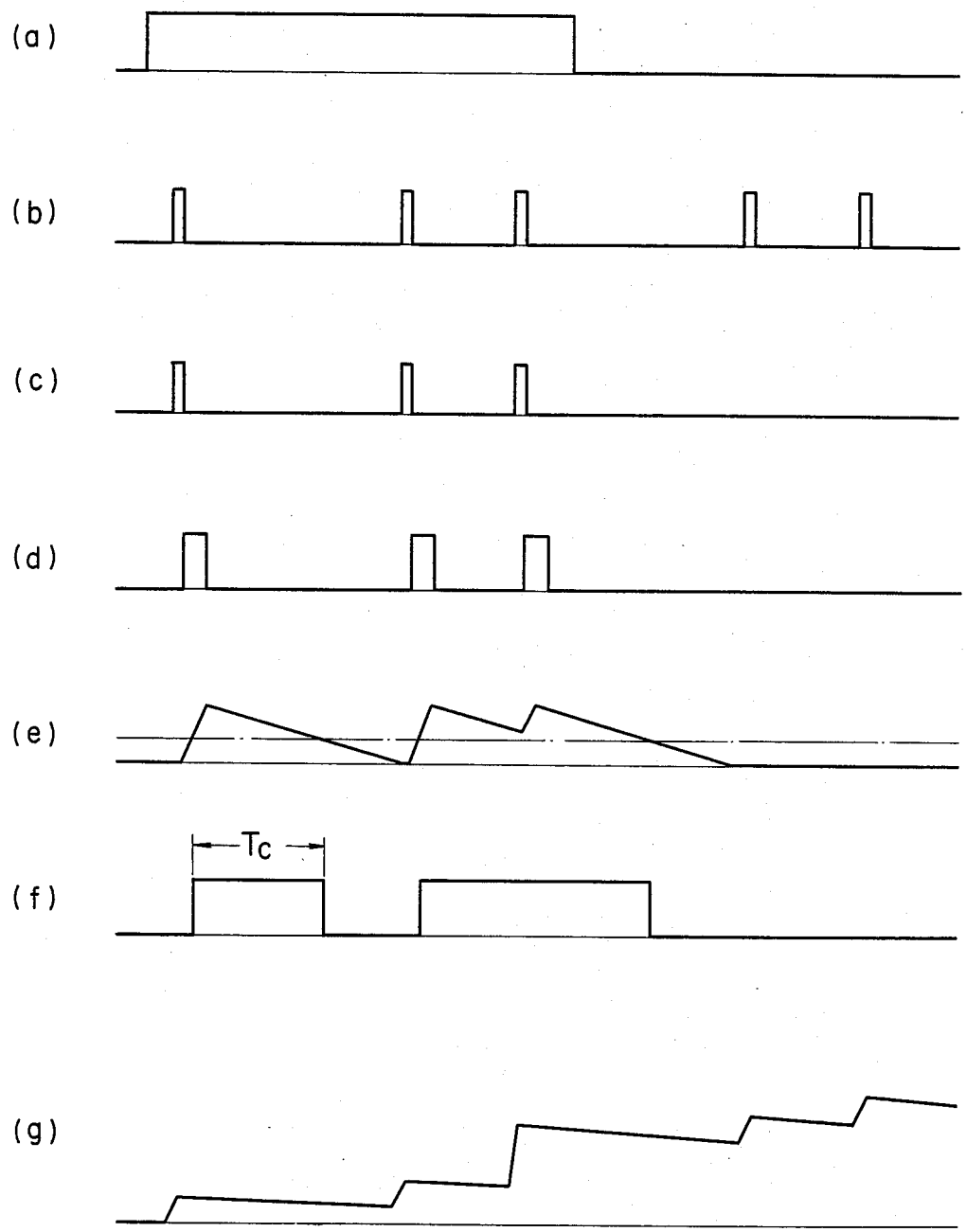
FIG. 9(a–g) illustrates a plurality of signal waveforms generated at various points in FIG. 8.

The operation of the retard angle variation circuit 44 and the retard angle computing circuit 45 will now be described with reference to FIG. 9. In all the waveforms of FIG. 9, the abscissa represents the time and the ordinate represents the voltage. Shown in (a) is the acceleration signal generated from the acceleration detecting circuit 42. In other words, this signal is maintained at the high level for the time $T_A$ from the instant that the acceleration is detected. Shown in (b) is the knock pulse generated from the monostable multivibrator 418. Shown in (c) is the output signal from the AND circuit 4401 which goes to the high level only when both of the acceleration signal (the waveform (a)) and the knock pulse (the waveform (b)) go to the high level. In other words, the signal represents the logical product of the waveforms (a) and (b). Shown in (d) is the output of the monostable multivibrator 4402 which is triggered by the trailing edge of the output signal (the waveform (c)) from the AND circuit 4401 to go to the high level for the given time $T_2$. Then, when the output signal (the waveform (d)) of the monostable multivibrator 4402 goes to the high level, the switch 4403 is turned on and the constant current $I_1$ is supplied to the charging and discharging circuit (4405, 4406) for the time interval.

Shown in (e) is the manner of charging and discharging the capacitor 4406.

Then, the voltage level of the capacitor 4406 is compared with the threshold level (the dot-and-dash line in (e)) by the comparator 4408. Shown in (f) is the output of the comparator 4408. In other words, the output goes to the high level so far as the capacitor voltage level is higher than the threshold level. The time $T_C$ during which the comparator output goes to the high level can be preset arbitrarily in dependence on the current values of the constant current sources 4404 and 4405 and the capacitance of the capacitor 4406. Thus, the signal (f) serves as a timer for counting the duration of the given time $T_C$ from the time of the occurrence of knocking once only when the acceleration signal (a) is at the high level (i.e., only when the acceleration is detected). Of course, if the next knocking occurs before the counting of the given time $T_C$, the time counting is started again at this point. Then, depending on whether the output signal (the waveform (f)) of the comparator 4408 is at the high level or the low level, the switch 4409 is switched between the two positions and one or the other of the constant current sources 4410 and 4411 is turned on. If it is assumed that the constant current values $I_3$ and $I_4$ have a relation $I_3 > I_4$, it is designed so that the constant current source 4410 is turned on when the signal (f) goes to the high level and the constant current source 4411 is turned on when the signal (f) goes to the low level. Thus, the larger current $I_3$ is supplied when the signal (f) goes to the high level.

On the other hand, the knock pulse (the waveform (b)) generated from the monostable multivibrator 418 turns on the switch 4501 of the retard angle computing circuit 45. When the switch 4501 is turned on, the current $I_3$ or $I_4$ determined by the retard angle variation circuit 44 is supplied to the charging and discharging circuit (4502, 4503). In this case, the voltage on the capacitor 4502 corresponds to the actual retard angle. The corresponding voltage to this retard angle is shown in (g).

As described hereinabove, when the acceleration is detected and also knock pulses are successively generated in the relatively short given time $T_C$, the amount of retard is set to a large value (e.g., 2° crank angle), and when no acceleration is detected or when the acceleration is detected but the generation of successive knock pulses within the time $T_C$ does not take place, the amount of retard is set to a small value (e.g., 0.5° crank angle), thereby increasing the stability during the steady-state operation and also preventing the amount of retard from becoming excessively large under conditions where the acceleration of the engine does not practically cause any heavy knocking due to the surrounding conditions, etc., to improve the acceleration performance to the maximum extent.

Figure 10:
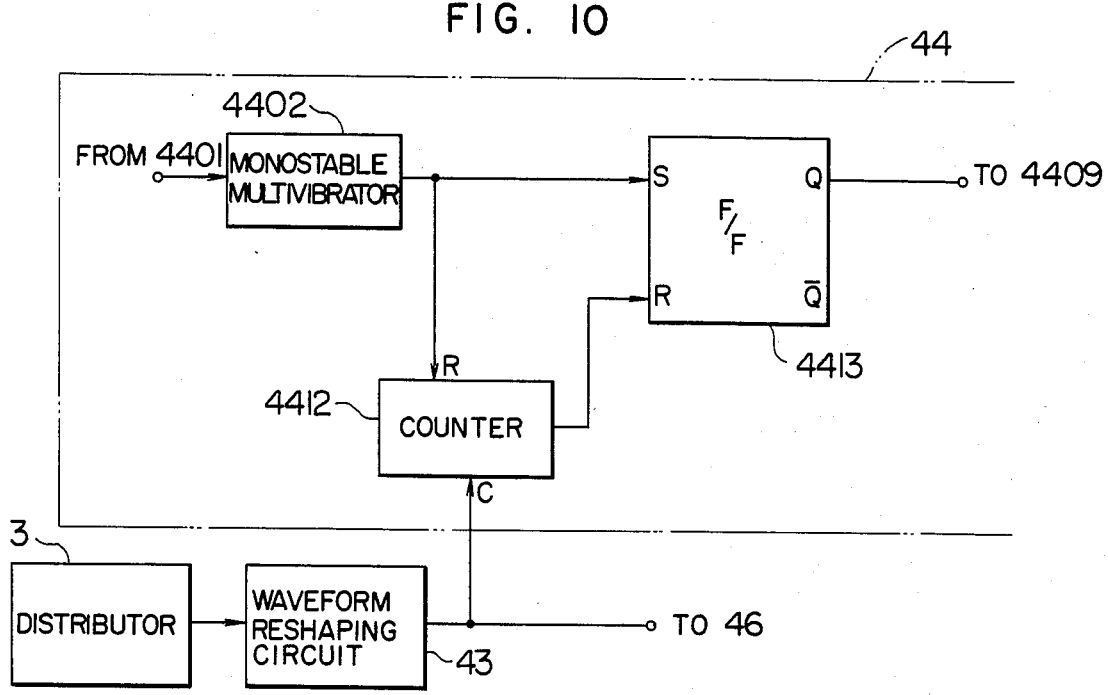
FIG. 10 is a block diagram showing the principal construction of a retard angle variation circuit in a second embodiment of the invention.

While, in the above-described first embodiment, the interval of occurrence of knocking is determined in terms of time, it may be determined in terms of the number of ignition cycles. This is shown as a second embodiment in FIG. 10. In this case, it is only necessary to replace the elements 4403 to 4408 of the first embodiment with a counter 4412 and a reset-set or R-S flip-flop 4413. The operation of the second embodiment will be described with reference to FIG. 10. The pickup signal generated from the distributor 3 is reshaped by the waveform reshaping circuit 43 and applied as a clock signal to the counter 4412. Since the pickup signal is a basic ignition timing signal generated prior to the combustion cycle of each cylinder to determine the basic ignition timing of the cylinder, the output signals produced by reshaping the pickup signals may be counted to detect the passage of the number of cycles.

Thus, if the counter 4412 is reset in response to the signal from the monostable multivibrator 4402 thereby causing it to start counting, upon occurrence of knocking during the time the acceleration signal is at the high level the counter 4412 counts the number of ignition cycles from the time of the knocking. For this purpose, the constant of the counter 4412 is set to a given number of cycles and a reset signal is applied to the R-S flip-flop 4413 through its terminal R.

On the other hand, the monostable multivibrator 4402 receives a knock pulse and supplies a set signal to the set (S) terminal of the R-S flip-flop 4413. When the set signal is applied, the R-S flip-flop 4413 goes to the high level and the high level is maintained until a reset signal is applied from the counter 4412. As a result, when knocking occurs during the time that the acceleration signal is at the high level, the R-S flip-flop 4413 goes to the high level as many times as the given number of cycles starting at the time of the occurrence of the knocking. It is only necessary to connect the output terminal (Q terminal) of the R-S flip-flop 4413 to the switch 4409 mentioned in connection with the first embodiment. The final stage of the operation is the same with the first embodiment and will not be described.

Figure 11:
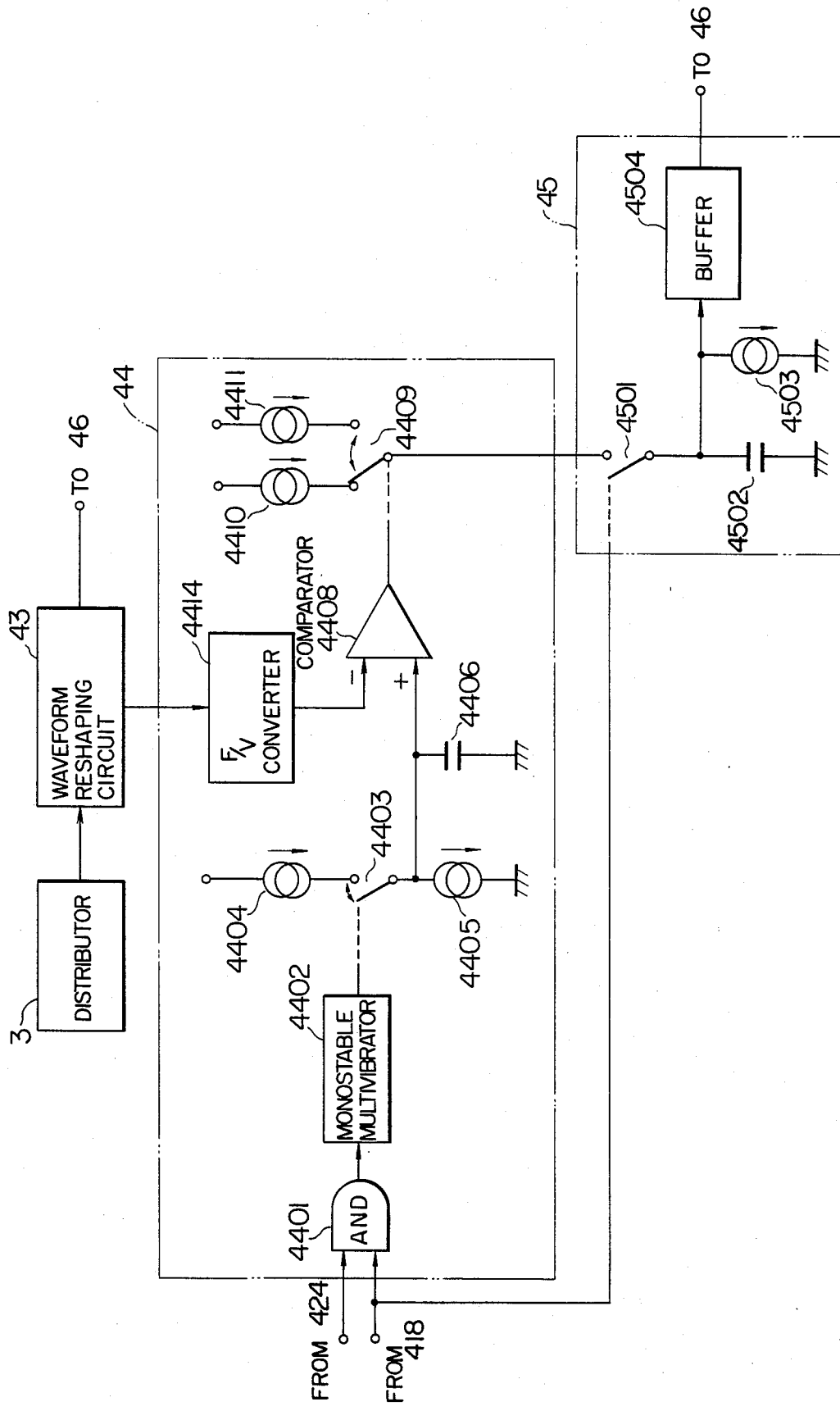
FIG. 11 is a block diagram showing in detail the construction of a retard angle variation circuit and a retard angle computing circuit in a third embodiment of the invention.

While, in the above-described first and second embodiments, the given time period and the given number of cycles are fixed, they may be varied in accordance with the engine conditions such as the engine speed. This is shown as a third embodiment in Fig.11. The third embodiment differs in construction from the first embodiment in that the threshold level setting means 4407 (see FIG. 8) is replaced with a frequency-to-voltage converter or F/V converter 4414 and the signal from the waveform reshaping circuit 43 is applied to the F/V converter 4414. The operation of the third embodiment will be described with reference to FIG. 12.

Figure 12:
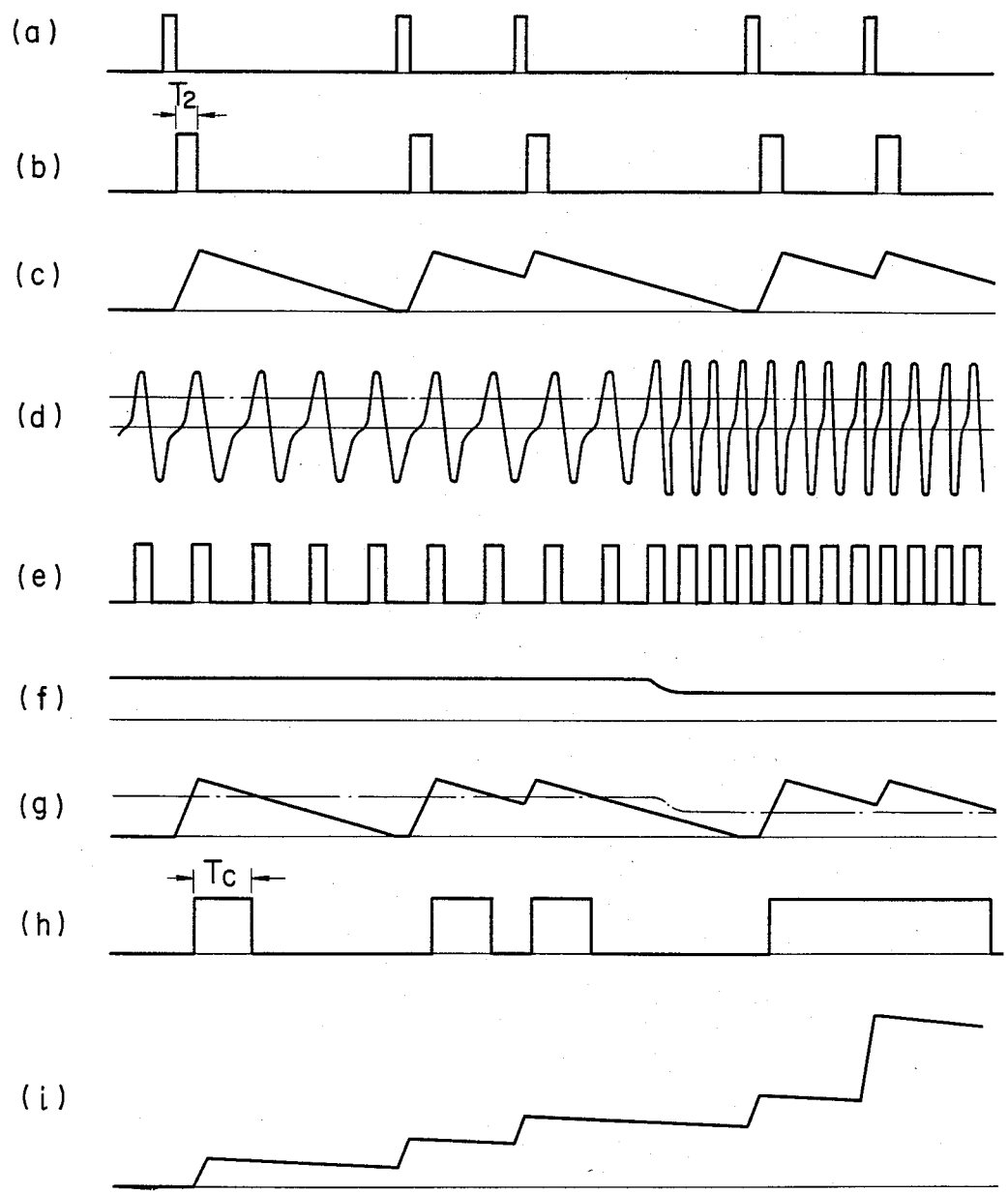
FIG. 12(a–i) illustrates a plurality of signal waveforms generated at various points in FIG. 11.

With all the waveforms shown in Fig.12, the abscissa represents the time and the ordinate represents the voltage. Firstly, shown in (a) of FIG. 12 is the output signal of the AND circuit 4401. In other words, the signal comprises the knock pulse generated while the acceleration signal is at the high level. Of course, these knock pulses will not be generated if no accleration is detected. Shown in (b) is the output of the monostable multivibrator 4402 which is triggered by the trailing edge of the knock pulse to go to the high level for the given time $T_2$. Then, when the output signal the waveform (b)) of the monostable multivibrator 4402 goes to the high level, the switch 4403 is turned on and the constant current $I_1$ is supplied to the charging and discharging circuit (4405, 4406) for the time interval. Shown in (c) is the manner in which the capacitor 4406 is charged and discharged. Shown in (d) is the pickup signal waveform generated from the distributor 3. Shown by the dot-and-dash line in (d) is the threshold level used when reshaping the pickup signal by the waveform reshaping circuit 43. Shown in (e) is the signal resulting from the reshaping of the pickup signal by the waveform reshaping circuit 43. Since the distributor pickup signal is generated in synchronism with the speed of the engine, if the engine speed changes from a low speed to a high speed, for example, the pickup signal is converted into a compressed form with respect to the time base as shown in (d). (Namely, the frequency is increased.)

As a result, the duty cycle of the reshaped signal (the waveform (e)) is also changed so as to increase its frequency in response to the engine speed. The signal (e) is subjected to frequency-to-voltage conversion in the F/V converter 4414 producing the voltage shown in (f). There are two types of F/V converters one of which increases its output voltage with increase in the input frequency and the other decreases its output voltage with increase in the frequency. In the present embodiment, the F/V converter 4414 is of the latter type which decreases the output voltage as the frequency increases. As a result, when the engine speed increases so that the frequency of the distributor pick-up signal increases, the output voltage changes in a direction to decrease as shown in (f).

Then, the voltage level (the waveform (c)) of the capacitor 4406 is compared with the threshold level in (f) established by the F/V converter 4414 by the comparator 4408. Shown in (g) is the manner in which the comparison is effected. In (g), the solid line represents the voltage level of the capacitor 4406 (corresponding to the waveform (e)) and the dot-and-dash line represents the threshold level (corresponding to the waveform (f)). Shown in (h) is the output of the comparator 4408. In other words, the compartor output signal goes to the high level so long as the capacitor voltage level is higher than the threshold level. While the time $T_C$ during which the comparator output signal goes to the high level can be preset as desired in dependence on the current values of the constant current sources 4404 and 4405 and the capacitance of the capacitor 4406, once its constant is determined, the time $T_C$ is varied with variation of the threshold level. Thus, the time $T_C$ is varied in accordance with the engine speed. As a result, the signal (h) serves as a timer which counts the duration of the given time $T_c$ determined in accordance with the engine speed upon occurence of knocking after the detection of the acceleration. Shown in (h) is the manner in which the threshold level is decreased with increase in the engine speed and hence the time $T_C$ is increased. The following operation is the same with the first embodiment and will not be described. Shown in (i) is the resulting retard angle variation.

While, in the above-described third embodiment, the given time is varied in accordance with the engine speed, it may for example be varied in accordance with the engine intake pressure or a combination of such engine conditions. Of course, the given number of cycles may be varied in accordance with these engine conditions.

Further, while, in the first to third embodiments, the acceleration detecting circuit 42, the retard angle variation circuit 44, the retard angle computing circuit 45 and the ignition timing computing circuit 46 are comprised of separate electric circuits, it is possible to use a microcomputer so as to replace all or some of these functions with software techniques. This is shown as a fourth embodiment in FIG. 13.

In the Figure, numeral 6 designates a four-cylinder four-cycle engine, 1 a knock sensor mounted on the engine 6 to detect the engine vibrations associated especially with the occurrence of knocking, 61 a starter, and 611 a starter switch. Numeral 7 designates a rotational angle sensor for detecting the rotational angular positions of the engine 6 whereby a TDC signal is generated when the rotation of the engine 6 reaches the top dead center or TDC position and a rotational angle signal is generated each time the engine 6 rotates through a given crank angle determined by equally dividing one engine rotation (e.g., 30 degrees in the case of this embodiment). Numeral 8 designates an intake pressure sensor for measuring the intake manifold pressure delivered to the pressure inlet port from an intake manifold 63 of the engine 6 through a pipe 631. Numeral 63 designates a known type of fuel supply system. Numerals 5 and 9 designate an igniter serving as an ignition actuator and an ignition coil. An ignition timing control circuit 4 computes the engine speed in accordance with the time interval between the rotational angle pulses generated from the rotational angle sensor 7 as well as the intake manifold pressure from the output voltage of the pressure sensor 8 thereby measuring the engine operating condition and also detects the occurrence of knocking from the output voltage of the knock sensor 1, thereby controlling the ignition timing. Also, to control the ignition timing to a specified value during the engine starting period, the voltage supplied to the starter 61 from the starter switch 611 is applied as a starter signal to the ignition timing control circuit 4. In addition, in order to vary the dwell time of the ignition coil 9 in accordance with the battery voltage, the battery voltage is applied as a battery voltage signal to the ignition timing control circuit 4. Numeral 65 designates a power supply for producing the power of the voltage required by the ignition timing control circuit 4 from the voltage of a battery 69 mounted in the vehicle.

Figure 13:
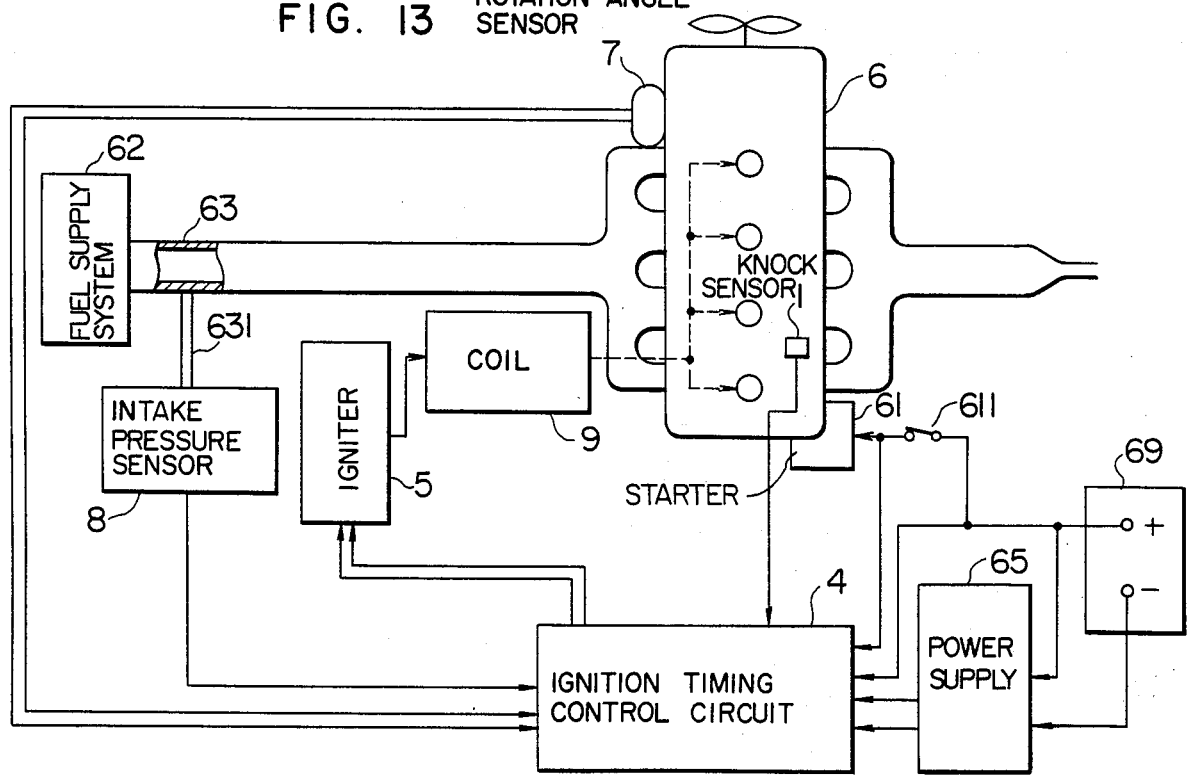
FIG. 13 is a block diagram showing the overall construction of a fourth embodiment of the invention.
Figure 14:
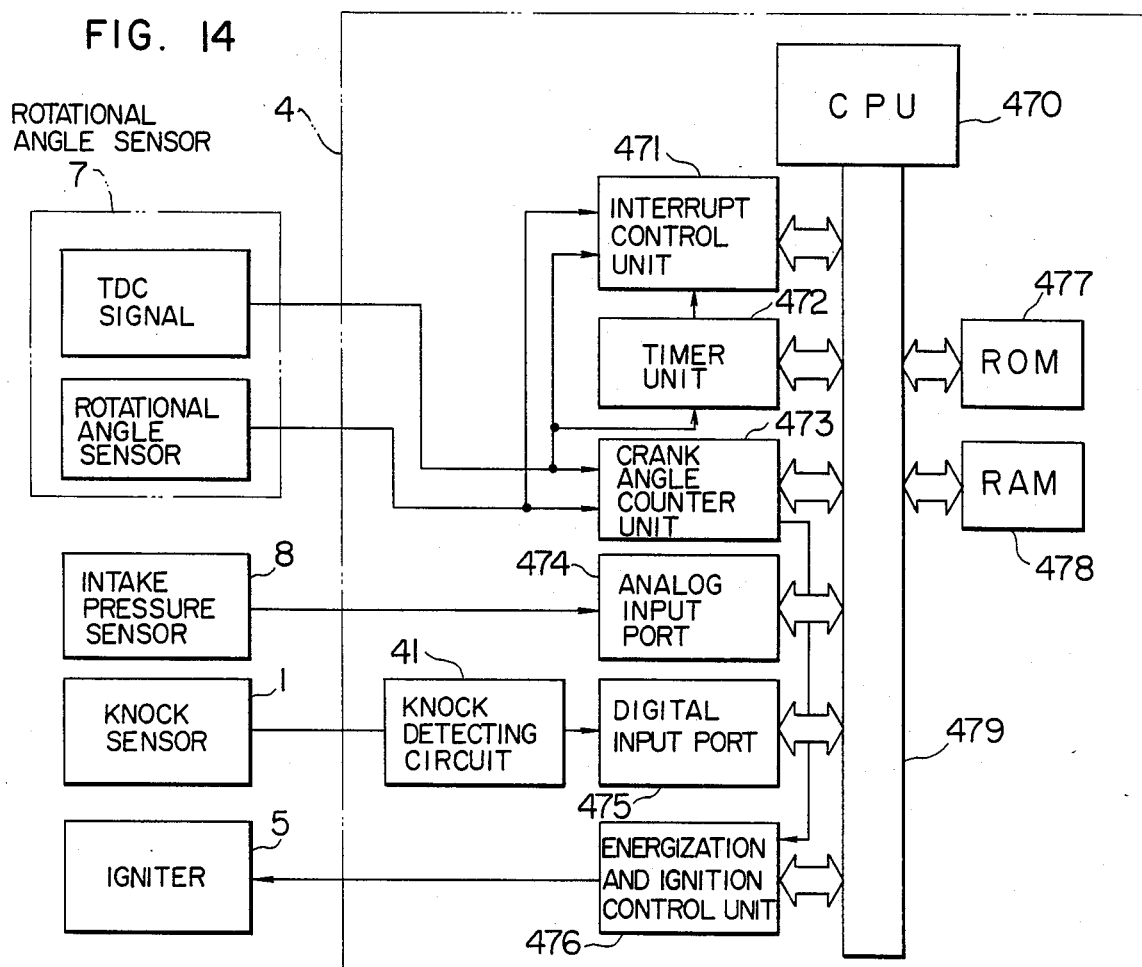
FIG. 14 is a block diagram showing in detail the construction of the ignition timing control circuit of FIG. 13.

FIG. 14 shows the construction of the ignition timing control circuit 4 in the embodiment of FIG. 13. Numeral 470 designates a central processing unit (CPU) comprising an 8-bit microcomputer. Numeral 477 designates a read-only memory unit (ROM) for storing a control program and control constants, and 478 a temporary memory unit (RAM) for storing control data when the CPU 470 is operating in accordance with the control program. Numeral 471 designates an interrupt control unit for effecting an interrupt in response to the generation of each rotational angle signal pulse from the engine rotational angle sensor 7.

A timer unit 472 comprises a 16-bit counter for counting a clock pulse signal generated at intervals of 8 μs and a latch for storing and holding the count value in response to the generation of each rotational angle signal pulse from the rotational angle sensor 7. Thus, in the interrupt processing caused by the generation of a rotational angle signal pulse, the CPU 470 reads the value of a crank angle counter unit 473 thus detecting the engine rotational angular position and also reads the latched value of the timer unit 472. This operation is performed at the successive two rotational angular positions and the difference between the latched values is obtained thereby measuring the time required for the engine to rotate through the angle between the two rotational angular positions and also measuring the engine speed.

The crank angle counter unit 473 counts up in response to each rotational angle signal from the rotational angle sensor 7 and in response to the rotational angle signal following the generation of a TDC signal the counter unit 473 is reset to zero count value so as to be synchronized with the engine rotation. As a result, by reading the value of the crank angle counter unit 473 through the CPU 473, it is possible to detect the engine rotational angle position in steps of 30° crank angle.

A digital input port 475 is used for the inputting and outputting of logical signals and the voltage level of the voltage supplied to the starter 61 from the starter switch 611 is applied to the digital input port 475 to detect that the starter switch 611 is turned on during the engine starting period. In addition, the digital input port 475 is used to generate a program interrupt signal which is supplied to the interrupt control unit 471. The knock detecting circuit 41 is of the same type described in connection with the first embodiment and its output signal (knock pulse) is applied to the digital input port 475.

An analog input port 474 measures the voltage value of analog signals and it subjects to analog-to-digital conversion the output voltage signal of the intake pressure sensor 8 which measures the intake manifold pressure of the engine 6 and the battery voltage for battery voltage compensation of the dwell time of the ignition coil 9.

An energization and ignition control unit 476 generates energization and ignition signals in the coil current actuator circuit of the igniter 5. The energization and ignition control unit 476 comprises a plurality of down counters and crank angle counter values for starting the counting of the down counters and down count values are instructed from the CPU 470 whereby when the down counter values become zero the coil energization signals go to a "0" level for energization and to a "1" level for ignition. Numeral 479 designates a common bus whereby the CPU 470 delivers control and data signals onto its bus signal lines and accomplishes the controls of the peripheral circuits and the transmission and reception of data.

Figure 15:
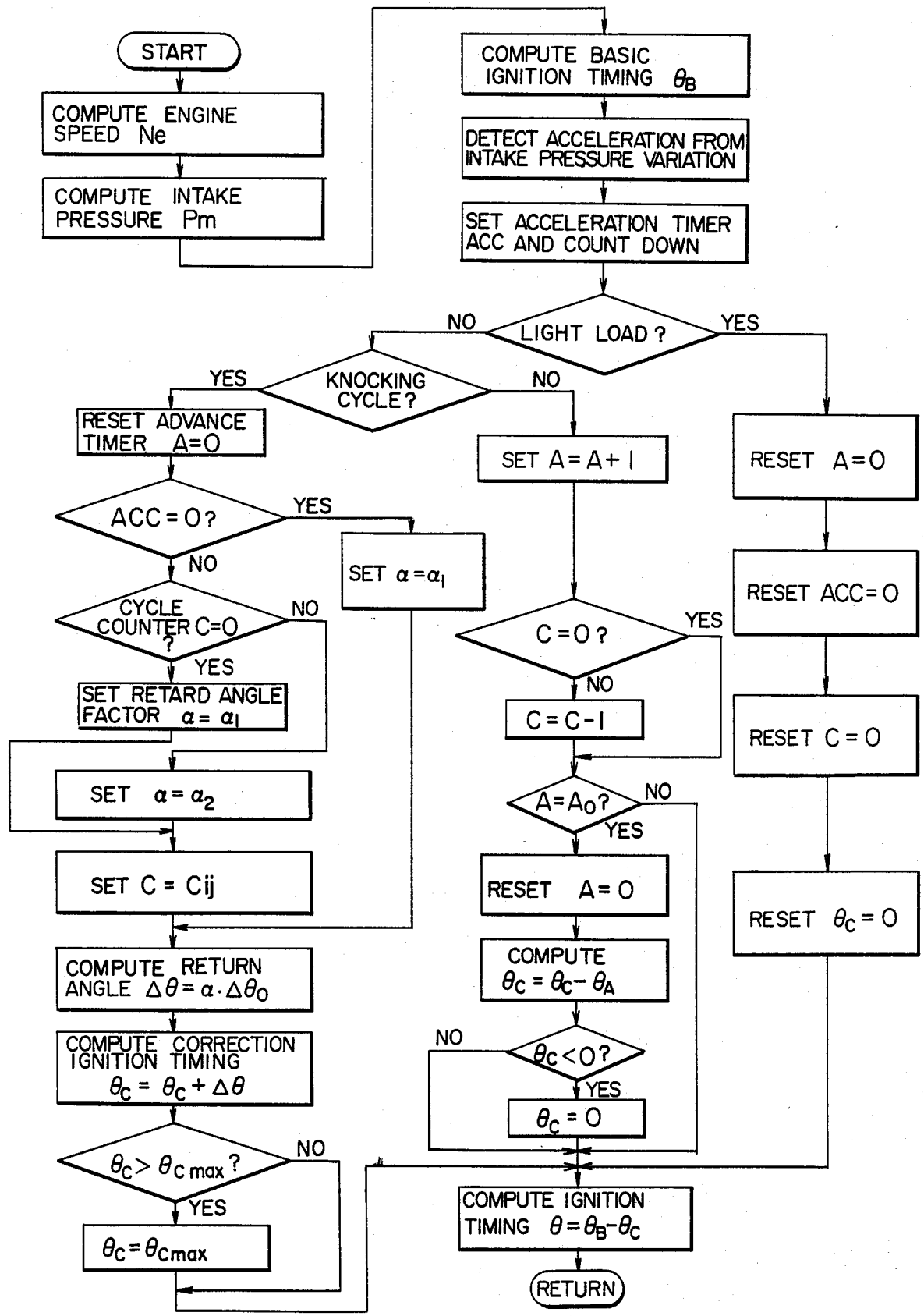
FIG. 15 is a flow chart showing the processing procedure of the ignition timing control circuit of FIG. 14.

Next, the method of ignition timing computation will be described. FIG. 15 is a flow chart showing an example of the ignition timing computing method. Firstly, in accordance with the engine speed Ne and intake pressure Pm derived respectively from the rotational angle sensor and intake pressure sensor signals a basic ignition timing $\theta_B$ corresponding to the operating condition and stored in the memory is obtained (from the two-dimensional map comprising engine speeds and intake pressures). Then, whether the engine is at the acceleration operation is detected in accordance with variation in the intake pressure. This method may be performed properly in the following way. If the currently measured intake pressure is represented as P and the intake pressure measured one cycle before is represented as $P_{mi-1}$, then the current intake pressure $P_{mi}$ is not represented as P but computed in terms of $$P_{mi} = \frac{7 \cdot P_{mi-1} + P}{8}.$$

The reason is that there are pulsations in the intake manifold and therefore an error will be caused in the intake pressure measurement under the influence of the pulsations if it is simply computed as $P_{mi}=P$. As a result, the abovementioned calculation is performed to determine the intake pressure in terms of the average value of the intake pressures measured in eight cycles. By computing the basic ignition timing $\theta_B$ using the thus determined $P_{mi}$, it is possible to greatly improve the ignition timing accuracy.

Then, the detection of acceleration is effected by using the current intake pressure $P_{mi}$ and the intake pressure $P_{mi-1}$ of the preceding cycle. In other words, when the engine comes into an acceleration operation, the intake manifold pressure varies considerably increasing the difference between $P_{mi}$ and $P_{mi-1}$. Thus, if the current intake pressure $P_{mi}$ is greater than the preceding intake pressure $P_{mi-1}$ and if the difference is greater than a predetermined value, it is determined that the engine is accelerating. When the acceleration is detected in this way, a given constant is set in an acceleration timer ACC. This acceleration timer ACC serves a timer function of counting the progress of a given number of cycles. In other words, the knocking under the acceleration condition does not occur just after the acceleration but frequently occurs at the expiration of about 0.1 second after the acceleration and thus the timer is used to hold the detection of the acceleration until such a time. If it is determined that the current cycle is not the acceleration, the count of the acceleration timer ACC is decrease by 1.

If the intake pressure $P_m$ is smaller than $P_1$ (e.g., $-360$ mmHg), it is determined that the engine is at a light load operation where the occurrence of knocking is out of the question. If the intake pressure $P_m$ is greater than $P_1$, whether the current combustion cycle of the knocking cycle is determined depending on whether the knock pulse is received from the knock detecting circuit. If the knocking cycle is determined, an advance timer is reset ($A=0$). Then, whether the value of the acceleration timer ACC is zero is determined so that if the value is zero, it is determined that the engine is at the steady-state operation and a retard angle factor $\alpha$ is changed over to a relatively small value $\alpha_1 (\alpha = \alpha_1)$. On the contrary, if the value of the acceleration timer ACC is not zero, it is determined that the acceleration condition is still continuing. If the continuation of the acceleration condition is determined, the value of a cycle counter C for counting a given number of cycles determined in correspondence to the engine condition is read out and the number of the ignition cycles took place during the interval between the knocking just occurred and the preceding knocking is checked. If the value of the counter C is not zero, the occurrence of successive knocks during the given number of cycles is determined and the retard angle factor $\alpha$ is change over to $\alpha_2$. If $C=0$, it is an indication that the given number of cycles are already over and the retard angle factor $\alpha$ is changed over to $\alpha_1(\alpha_1 < \alpha_2)$. Then, in order to count the number of ignition cycles following the knocking just occurred, the value of the cycle counter C is set to a given number of cycles corresponding to the engine speed and the intake pressure ($C = C_{ij}$). For example, the value $C_{ij}$ is determined in accordance with the following table.

|  | Engine speed N | (Unit of cycle) | | |
|---|---|---|---|---|
|  |  | j = 1 | j = 2 | j = 3 |
|  |  | Intake pressure Pm | | |
|  |  | Below −240 mmHg | −240~ −120 mmHg | Over −120 mmHg |
| i = 1 | Below 800 rpm | 0 | 0 | 0 |
| i = 2 | 300~2,000 rpm | 1 | 2 | 4 |
| i = 3 | 2,000~4,000 rpm | 0 | 8 | 16 |
| i = 4 | Over 4,800 rpm | 0 | 0 | 0 |

The value of $C_{ij}=0$ is set (as in the case of over 4,800 rpm) in order to substantially invalidate the function of varying the retard angle in accordance with the successive occurrence of knocks in this region.

Then, a retard angle $\Delta\theta$ and a correction ignition timing $\theta_C$ are respectively computed from $\Delta\theta = \alpha.\Delta\theta_O$ and $\theta_C = \theta_C + \Delta\theta$. Here, $\Delta\theta_O$ represents the basic unit of retard angle and it is selected to be 0.5° crank angle, for example. Assuming that $\alpha_1 = 1$ and $\alpha_2 = 4$, $\Delta\theta = 2°$ crank angle ($4 \times 0.5$) is obtained when the acceleration is detected and knocks occur successively within the given number of cycles and $\Delta\theta = 0.5°$ crank angle ($1 \times 0.5$) is obtained when the reverse is the case. The correction ignition timing $\theta_C$ is the total retard angle from the basic ignition timing. Note that an upper limit $\theta_{Cmax}$ is set to the value of $\theta_C$ and thus it serves the function of a limiter which prevents any further retardation beyond the upper limit. Then, the final ignition timing for the next ignition is computed from $\theta = \theta_B - \theta_C$.

On the contrary, if the current combustion cycle is not the knocking cycle, the count of the advance timer A is increased by 1 ($A = A + 1$). Then, the cycle counter C counts down to count the progress of the number of ignition cycles since the preceding knocking. Then, whether the advance timer A has attained a given number is checked so that if the given number has been reached, the correction ignition timing is decreased by the value of $Q_A$ (e.g., 0.5° crank angle) and thus the ignition timing is corrected in a direction to advance the ignition timing.

On the other hand, the condition $P_m < P_1$ represents a light load operation where no knocking occurs so that the advance timer A, the acceleration timer ACC and the cycle counter C are reset to zero and also the correction ignition timing is reduced to zero.

When this occurs, the ignition timing $\theta$ becomes equal to the basic ignition timing $\theta_B$ and the maximum advance is provided. As a result, during the period of light load operation the maximum advance of the ignition timing is provided quickly and any loss of the engine performance due to a retard angle is prevented. In the manner described so far, the proper ignition timing is computed and the engine is ignited through the igniter and the coil.

Figure 16:
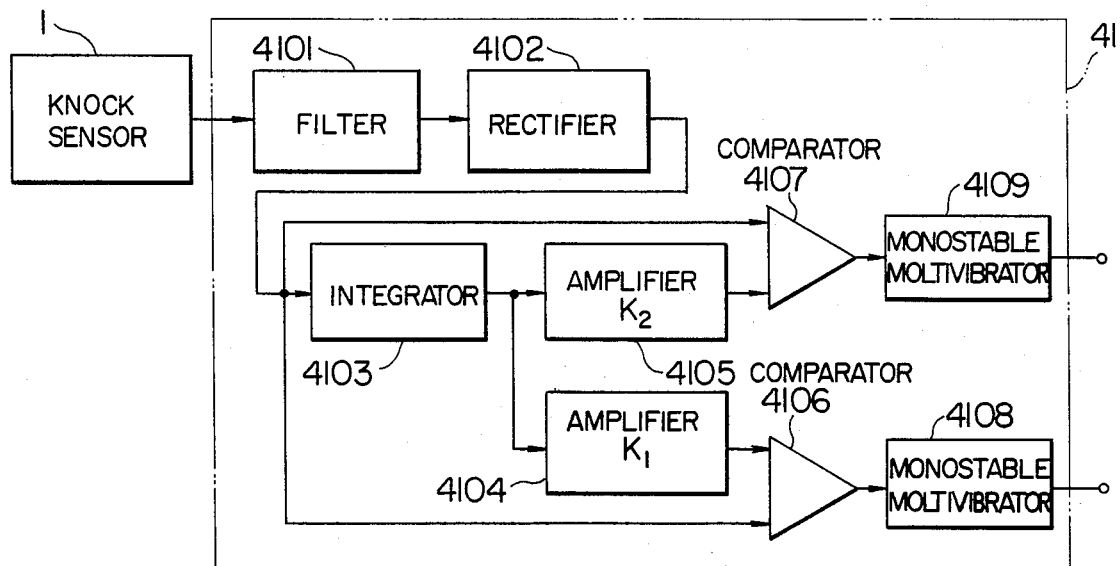
FIG. 16 is a block diagram showing in detail the construction of the knock detecting circuit in the fourth embodiment of the invention.

Referring now to FIG. 16 et seq., still another embodiment of the invention will be described in which when the acceleration is detected by acceleration detecting means and a high-intensity knocking is also detected by knock detecting means, it is readily determined that the engine is at the transitional condition and the amount of retard per knocking event is increased thereby improving the transitional operating performance, whereas when no acceleration is detected or when the acceleration is detected but only a low-intensity knocking is detected, it is determined that the engine is at the steady-state condition or light transitional condition and the amount of retard per knocking event is maintained at a relatively small value thereby improving the steady-state operating performance.

Where the ignition timing is controlled by a knock feedback system, the intensity of knocking occurring during the steady-state period is relatively small and heavy knocking is caused during the transitional period such as the acceleration period. However, there are cases where heavy knocking is caused from time to time even during the steady-state period with the result that if no acceleration signal is detected in such a case, an undesirably large retard angle will be provided from time to time during the steady-state period and the steady-state performance is deteriorated. On the contrary, if only an acceleration signal is detected, a large retard angle is provided irrespective of the manner of occurrence of the knocking caused by the acceleration with the result that the ignition timing is retarded even during the acceleration period where no large retard angle is required depending on the variations in characteristic among different engine, surrounding conditions, etc., and the acceleration performance is deteriorated. These deficiencies can be overcome by distinguishing between the steady-state and transitional conditions in accordance with both acceleration signal information and knock intensity information and changing over the amount of retard from one to another and thus both the steady-state performance and the transitional performance can be improved considerably than previously.

Figure 4:
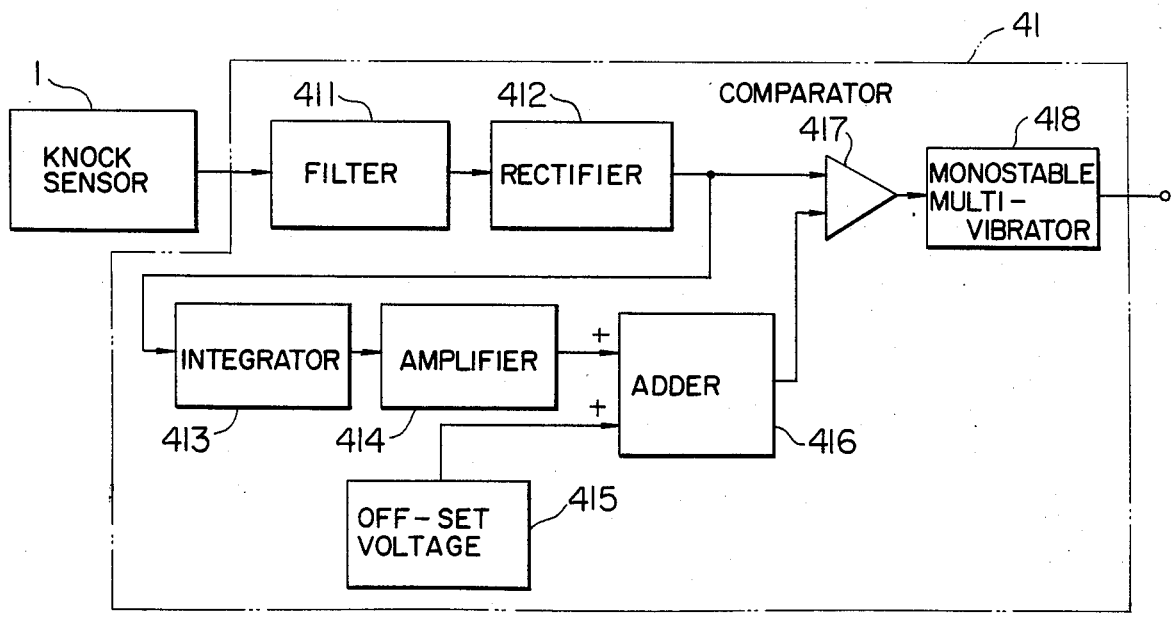
FIG. 4 is a block diagram showing in detail the construction of the knock detecting circuit shown in FIG. 3.

The block construction of an embodiment of the ignition timing control circuit for internal combustion engines in which the amount of retard is changed over between the two values in accordance the detection of an acceleration signal and the magnitude of the intensity of the detected knocking is the same with the construction shown in FIG. 3 except the knock detecting circuit and the retard angle variation circuit and the retard angle computing circuit which differ from those shown in FIGS. 4 and 8, respectively.

The construction of the knock detecting circuit 41 will now be described in detail with reference to FIG. 16. Numeral 4101 designates a filter comprising for example a band-pass filter or a high-pass filter for selecting and passing only the knocking frequency components of the output from the knock sensor 1, 4102 a half-wave rectifier for half-wave rectifying the output of the filter 4101, 4103 an integrator for integrating the output of the half-wave rectifier 4102 to obtain the average value of the vibration output of the knock sensor 1, 4104 an amplifier for amplifying by $K_1$ times the output of the integrator 4103 to produce a first knock discrimination level, 4105 an amplifier for amplifying by $K_2$ times the output of the integrator 4103 to produce a second knock discrimination level, 4106 a comparator for comparing the output of the half-wave rectifier 4102 and the first discrimination level produced by the amplifier 4104 and generating an output when the output of the half-wave rectifier 4102 is higher than the other, and 4107 a comparator for comparing the output of the half-wave rectifier 4102 and the second discrimination level which may be comprised of the same type as the comparator 4106. Numerals 4108 and 4109 designate monostable multivibrators which are respectively triggered by the leading edge of the output of the comparators 4106 and 4107, respectively, to maintain its voltage signal for a given period of time from the triggering. In this case, the monostable multivibrators 4108 and 4109 may be of the same type.

Figure 17:
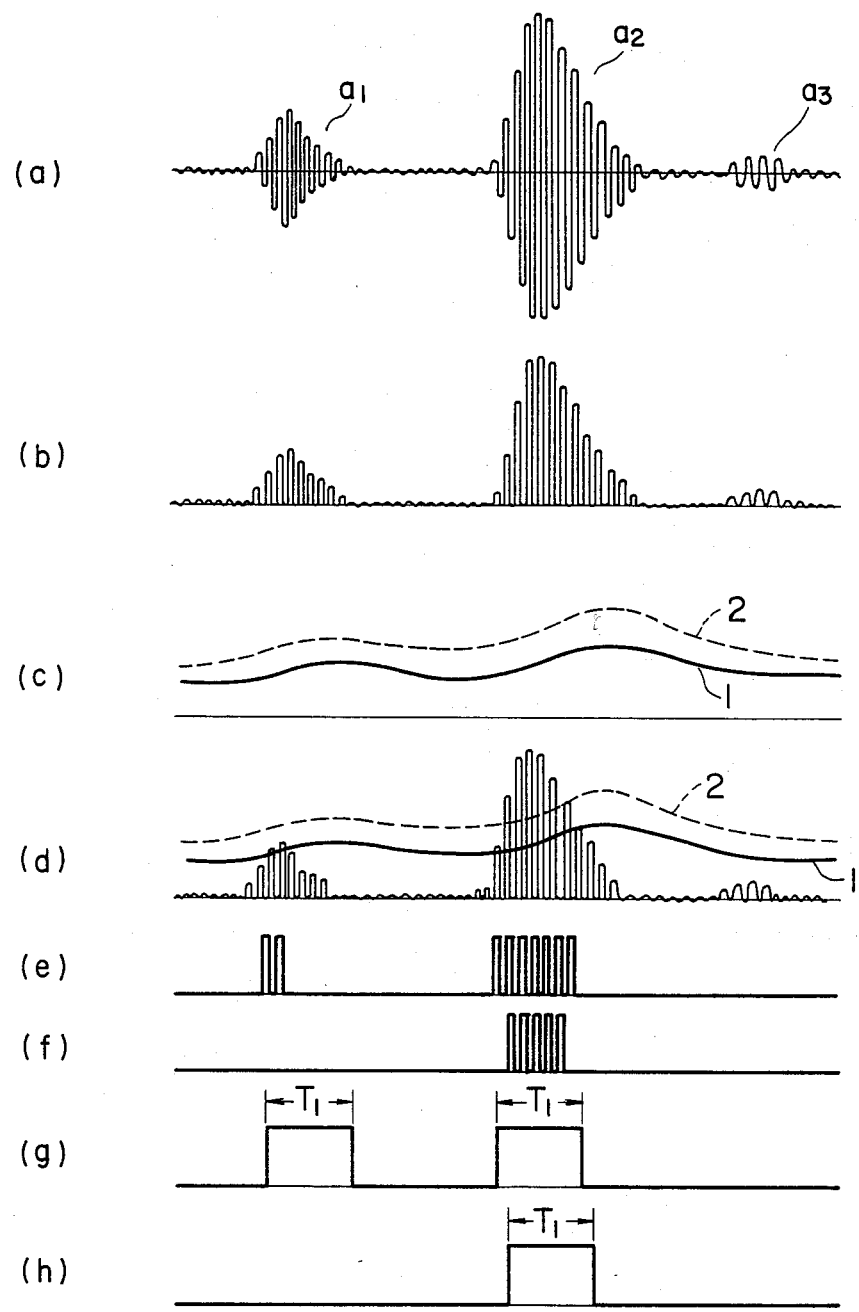
FIG. 17(a–h) illustrates a plurality of signal waveforms generated at various points in FIG. 16.

The operation of the knock detecting circuit 41 will now be described with reference to FIG. 17. In the Figure, shown in (a) is the output signal of the filter 4104 which is produced by selecting and passing only the knocking frequency components (6 to 9 kHz) of the output from the knock sensor 1. In (a), $a_1$, $a_2$ and $a_3$ designate the outputs respectively corresponding to three different knock intensities. More specifically, the output $a_1$ corresponds to a relatively low-intensity knocking, the output $a_2$ a relatively high-intensity knocking and the output $a_3$ noise or knocking of a very low intensity. Shown in (b) is the signal produced by half-wave rectifying the waveform (a), and shown in (c) are the signals produced by integrating and amplifying the signal (b) through the integrator 4103 and the amplifiers 4104 and 4105. In (c), indicated at 1 (the solid line waveform) is the first knock discrimination level and indicated at 2 (the broken line waveform) is the second knock discrimination level produced by the amplifier 4105. Shown in (d) are the signals of (b) and (c) which are shown together. Shown in (e) is the output signal of the comparator 4106 and shown in (f) is the output signal of the comparator 4107. Each of the signals (e) and (f) goes to the high level when the output signal (the waveform (b)) of the rectifier 4102 is greater than the knock discrimination level and goes to the low level when the reverse is the case. Shown in (g) and (h) are the output signals of the monostable multivibrators 4108 and 4109, respectively, which are triggered by the leading edges of the output signals of the comparators 4106 and 4107 to go to the high level for a given time $T_1$. Since the knock outputs $a_1$ and $a_2$ in (a) are greater than the given magnitude determined by the first knock discrimination level, the occurrence of knocking is determined as shown in (g) and the knock pulses are generated.

In other words, the first knock discrimination level is provided to determine the presence or absence of knocking and the result of the determination causes the generation of a knock pulse as shown in (g). On the other hand, the second knock discrimination level is provided to discriminate the intensity of knocking and the occurrence of knocking greater than the second knock discrimination level results in the generation of a knock pulse as shown in (h). In this way, the monostable multivibrator 4108 generates an output signal indicative of the presence or absence of knocking and the monostable multivibrator 4109 generates an output signal when high-intensity knocking occures, and the knock detecting circuit 41 generates signals corresponding to the presence or absence of knocking and the intensity of knocking, respectively.

Figure 18:
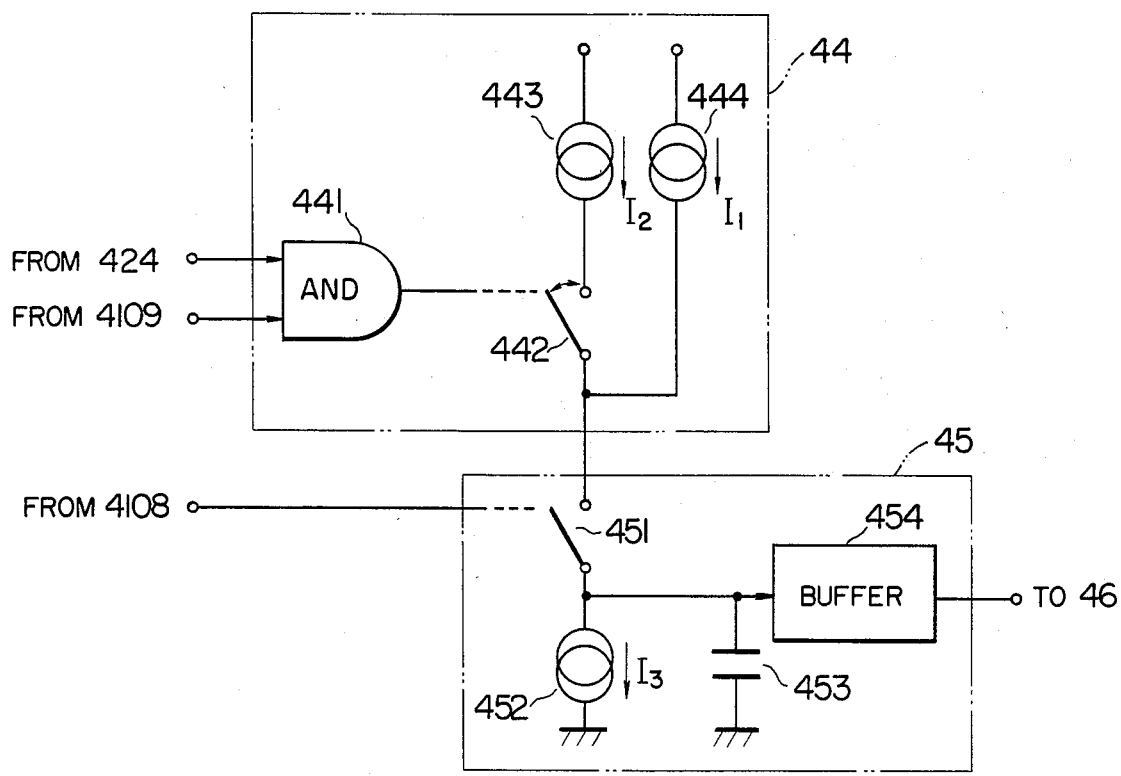
FIG. 18 is a block diagram showing in detail the construction of the retard angle variation circuit and the retard angle computing circuit in the fourth embodiment.
Figure 19:
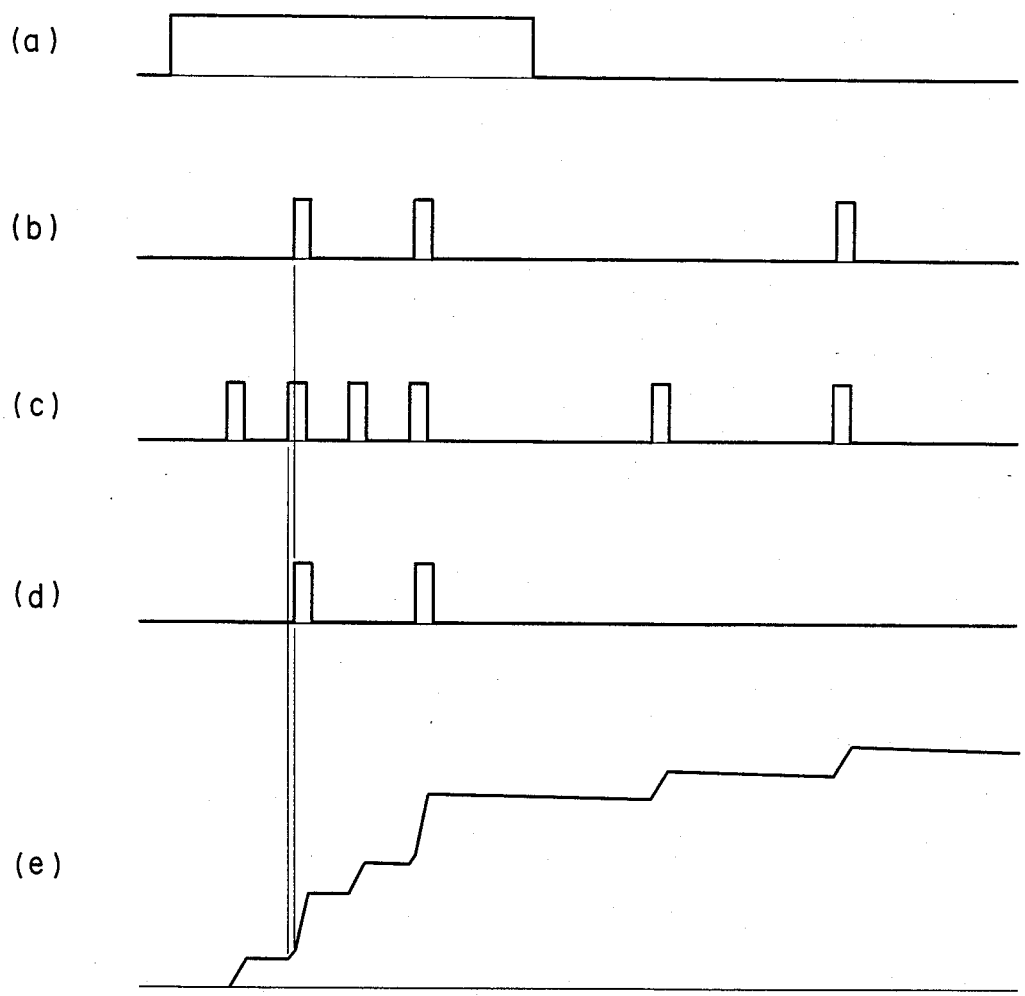
FIG. 19(a–e) illustrates a plurality of signal waveforms generated at various points in FIG. 18.

Next, the detailed construction and operation of the retard angle variation circuit 44 and the retard angle computing circuit 45 forming the essential parts of the present embodiment will be described with reference to FIGS. 18 and 19. FIG. 18 shows in detail the construction of the retard angle variation circuit 44 and the retard angle computing circuit 45. In the Figure, numeral 441 designates an AND circuit whose output goes to the high level when the outputs of the monostable multivibrators 424 and 4109 both go to the high level, 442 a switch comprising a transistor or the like which is closed (turned on) only during the time that the output of the AND circuit 441 goes to the high level, 443 and 444 constant current sources for respectively supplying constant currents $I_2$ and $I_1$, 451 a switch which is turned on only during the time that the monostable multivibrator 4108 goes to the high level (i.e., during the duration of a knock pulse), 452 a constant current source for discharging a constant current $I_3$, 453 a charging and discharging capacitor, and 454 a buffer for stably delivering the voltage of the capacitor 453.

Next, the operation of the retard angle variation circuit 44 and the retard angle computing circuit 45 will be described with reference to FIG. 19. Shown in (a) is the acceleration signal generated from the acceleration detecting circuit 42. The acceleration detecting circuit 42 is the same in construction and operation with the counterparts described in connection with FIGS. 6 and 7 and the acceleration signal remains at the high level only for the duration of a time $T_A$ from the time of detection of the acceleration condition. Shown in (b) is the output signal of the monostable multivibrator 4109 which is generated only in response to the occurrence of heavy knocking. Shown in (c) is the knock pulse generated from the monostable multivibrator 4108 in response to the occurrence of knocking. Shown in (d) is the output signal of the AND circuit 441 which is a logical product signal of the acceleration signal (the waveform (a)) and the knock intensity signal (the waveform (b)). In other words, this signal goes to the high level only when the acceleration is detected and a high-intensity knocking is caused. When the signal (d) goes to the high level, the switch 442 is turned on so that the constant current $I_2$ from the constant current source 443 is added to the constant current $I_1$ from the constant current source 444 and a large current is supplied to the retard angle computing circuit 45. In other words, the change-over between the two currents $I_1$ and $(I_1+I_2)$ is effected in response to the signal (d). On the other hand, the knock pulse (the waveform (c)) generated from the monostable multivibrator 4108 turns on the switch 451 of the retard angle computing circuit 45. When the switch 451 is turned on, the current $I_1$ or $(I_1+I_2)$ determined by the retard angle variation circuit 44 is supplied to the charging and discharging circuit (452, 453). In this case, the voltage on the capacitor 453 corresponds to the actual retard angle. This voltage is shown in (e). The retard angle per knocking event can be set, for example, to 0.5° crank angle for the current $I_1$ and to 2° crank angle for the current $(I_1+I_2)$ by suitably selecting the values of $I_1$ and $I_2$.

It will be seen from the foregoing that when the acceleration is detected and heavy knocking occurs, a large retard angle (e.g., 2° crank angle) is selected to increase the transitional response, whereas when no acceleration is detected or when the acceleration is detected but no heavy knocking occurs, a small retard angle (e.g., 0.5° crank angle) is selected thereby increasing the stability during the steady-state operation and also any undesired retard angle is prevented under such conditions where the acceleration of the engine has no danger of causing heavy knocking due to the surrounding conditions, etc., thus improving the acceleration performance to the maximum extent.

Figure 20:
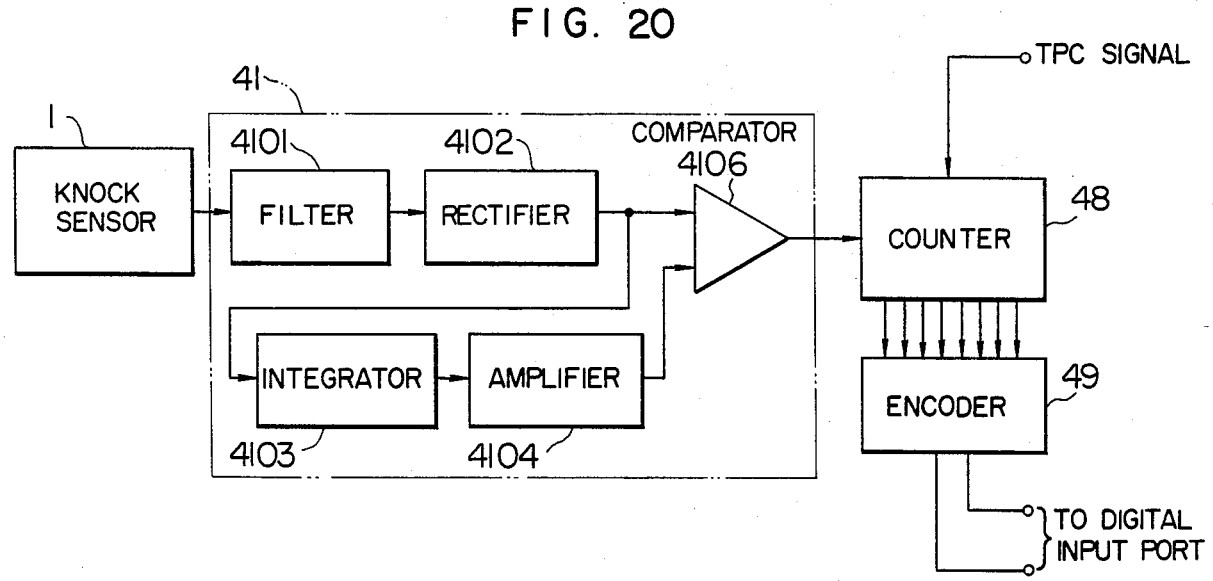
FIG. 20 is a block diagram showing in detail the construction of a knock detecting circuit in a fifth embodiment of the invention.

While, in the above-described embodiment, the acceleration detecting circuit 42, the retard angle variation circuit 44, the retard angle computing circuit 45 and the ignition timing computing circuit 46 are comprised of separate electric circuits, it is possible to use a microcomputer so as to replace all or some of these functions with software techniques. Further, while, in the above-described embodiment, the knocking intensity is discriminated in accordance with the two knock discrimination levels, the discrimination can be accomplished by using only a single knock discrimination level. The overall construction of an embodiment of the ignition timing control system adapted for the software control is the same as the construction shown in FIG. 13. The construction of the ignition timing control circuit in this embodiment is the same as the construction shown in FIG. 14 except that the knock detecting circuit is of the type which generates a number of knock pulses proportional to the intensity of knocking and that the knock pulses are counted by a counter and the count contents are coded by an encoder and sent to the digital input port. FIG. 20 shows a construction for detecting the knock pulses from the knock sensor output and counting, coding and sending the knock pulses to the digital input port. In the Figure, numeral 41 designates the knock detecting circuit responsive to the signal from the knock sensor 1 to generate a number of knock pulse proportional to the knock intensity, and 48 a counter which each time the top dead center is reached, for example, is reset to count the knock pulses and converts the count into a binary coded parallel signal. Numeral 49 designates an encoder for classifying the parallel output of the counter 48 in accordance with the count value and converting it to a lesser number of connecting lines.

The embodiment of FIG. 20 differs from that of FIG. 16 in that the amplifier 4105, the comparator 4107 and the monostable multivibrators 4108 and 4109 are eliminated. In other words, while the embodiment of FIG. 16 uses the two knock discrimination levels to discriminate the intensity of knocking, the embodiment of FIG. 20 features that the intensity of knocking is discriminated in accordance with a single knock discrimination level. The operation of the embodiment up to the stage of the comparator 4106 is the same with the method of discriminating the presence of knocking (the comparison method of the first discrimination level and the sensor signal) and will not be described in detail but will be described again briefly. When the knock sensor signal exceeds the knock discrimination level, the output of the comparator goes to the high level. Since the knock sensor signal is usually a high frequency signal (6 to 9 kHz), the output comprises pulses. These pulses are generated only during the time that the sensor signal crosses the discrimination level and this time is proportional to the intensity of knocking. The number of pulses generated from the comparator in response to the large knocking $a_2$ is greater than in the case of the small knocking $a_1$ as shown in (e) of FIG. 17 showing the embodiment of FIG. 16.

Then, the number of knock pulses is proportional to the intensity of knocking and the knock intensity can be detected by counting the number of the knock pulses. This counting is accomplished by the counter 48 which in turn generates a binary coded parallel signal. To count the parallel output within a given number of knock pulses, e.g., 256 pulses, the required information capacity is 8 bits. In other words, eight connecting lines are required. Thus, the following encoder 49 classifies the parallel output in accordance with the number of knock pulses (the count value of the counter 48) thereby decreasing the number of the connection lines. If, for example, 8-bit signals are classified into four cases, the number of connection lines is reduced to 2. The knock signal classified in accordance with the knock intensity in this way is applied to the digital input port 475. The signals applied to the digital input ports 475 from the encoder 49 are classified as shown in the following table, for example.

|  | Knock pulse | | | |
| --- | --- | --- | --- | --- |
|  | 0 | 1–15 | 16–31 | 31– |
| Output $Q_0$ | 0 | 1 | 0 | 1 |
| Output $Q_1$ | 0 | 0 | 1 | 1 |
| — | Non-knocking | Light knocking | Medium knocking | Heavy knocking |

In this way, the knock intensity is discriminated by the CPU 470 in accordance with the states of the signals ($Q_0$, $Q_1$) from the encoder 49.

Figure 21:
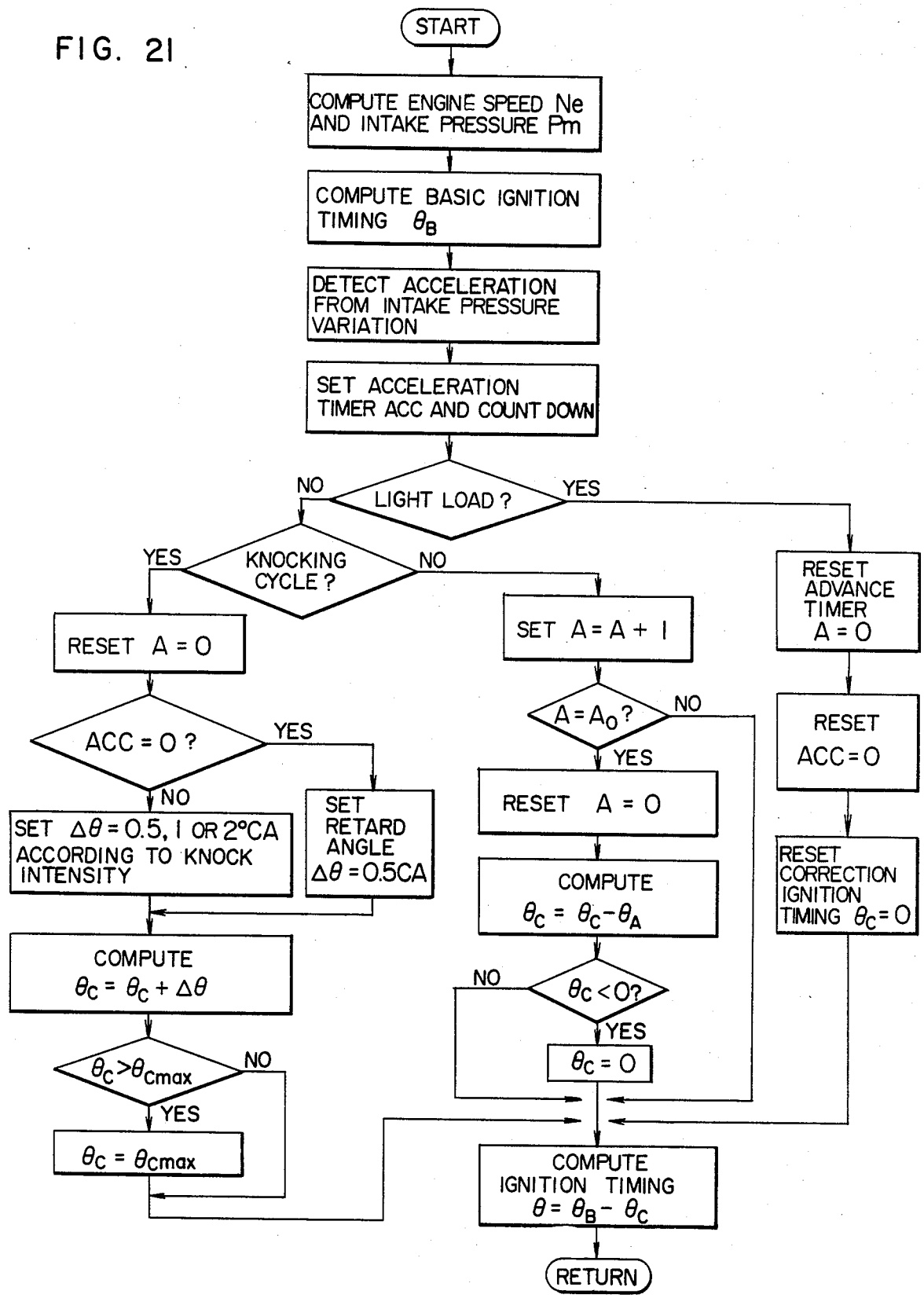
FIG. 21 is a flow chart showing the processing procedure of the fifth embodiment.

Next, the method of ignition timing computation will be described. FIG. 21 is a flow chart showing an example of the ignition timing computing method. Firstly, in accordance with the engine speed Ne and the intake pressure $P_m$ derived from the rotational speed sensor signal and the intake pressure sensor signal, respectively, a basic ignition timing $\theta_B$ corresponding to the operating condition stored in the memory is obtained (from the two-dimensional map comprising the engine speeds and intake pressures). Then, whether the engine is at the acceleration operation is determined in accordance with the intake pressure variation. This method may for example be accomplished in the following manner. Assuming first that the currently measured intake pressure is represented as P and the intake pressure computed one cycle before is represented as $P_{mi-1}$, then the current intake pressure $P_{mi}$ is not represented as P but it is computed from $$P_{mi} = \frac{7 \cdot P_{mi-1} + P}{8}.$$

The reason is that there are pulsations in the intake manifold and thus are pulsations in the intake manifold and thus an error will be caused in the intake pressure measurement due to the effect of the pulsations if the computation is made simply as $P_{mi}=P$. Thus, the computation is effected in the described manner so as to determine the intake pressure in terms of the average value of the pressures measured in the eight successive cycles. If the basic ignition timing $\theta_B$ is obtained by using the thus determined intake pressure $P_{mi}$, the accuracy of the ignition timing can be improved considerably. Now, the detection of acceleration is effected in accordance with this intake pressure $P_{mi}$ and the intake pressure $P_{mi-1}$ computed one cycle before. In other words, when the engine comes into the acceleration operation, the intake pressure is varied greatly and the difference between the intake pressures $P_{mi-1}$ and $P_{mi}$ is increased. Thus, if the current intake pressure $P_{mi}$ is greater than the preceding intake pressure $P_{mi-1}$ and if the difference is greater than a given value, it is determined that the engine is at the acceleration operation. Thus, when the acceleration is detected, a given constant is set in an acceleration timer ACC. The timer ACC functions as a timer for counting the progress of the given number of cycles from the time of the detection of the acceleration. In other words, the occurrence of knocking under the acceleration condition does not take place just after the acceleration but it takes place at the expiration of about 0.1 second after the acceleration and therefore the detection of the acceleration condition is maintained until such a time. If it is determined that the current cycle is not the acceleration operation, the count of the acceleration timer ACC is decreased by 1.

On the other hand, if the intake pressure $P_m$ is lower than the intake pressure $P_1$ (e.g., $-360$ mmHg), it is determined that the current cycle is a light load operation where the occurrence of knocking is out of the question. If $P_m > P_1$, whether the current combustion cycle is the knocking cycle is determined in accordance with the reception or nonreception of knock pulses from the knock detecting circuit. If the current cycle is determined as the knocking cycle, an advance timer is reset ($A=0$). Then, whether the value of the acceleration timer ACC is zero is determined so that if the value is zero, it is determined that the engine is at the steady-state operation and the retard angle $\Delta\theta$ per knocking event is changed over to a relatively small value of $0.5°$ crank angle irrespective of the intensity of the knocking. On the contrary, if the value of the acceleration timer ACC is not zero, it is determined that the acceleration operation is continuing. If the continuation of the acceleration operation is determined, the retard angle corresponding to the knock intensity is selected in accordance with the signal applied from the encoder 48. For example, the retard angle $\Delta\theta$ is changed to $0.5°$, $1°$ or $2°$ crank angle in accordance with the intensity of the knocking.

Then, a correction ignition timing $\theta_C$ is computed from $\theta_C = \theta_C + \Delta\theta$. The correction ignition timing $\theta_C$ is a retard angle from the basic ignition timing. An upper limit $\theta_{Cmax}$ is set to the correction ignition timing $\theta_C$ and thus it serves as a limiter which prevents any further retardation of the ignition timing. Then, the final ignition timing $\theta$ for the next ignition is computed from $\theta = \theta_B - \theta_C$.

On the other hand, if the current combustion cycle is not the knocking cycle, the count of the advance timer is increased by 1 ($A = A + 1$). Then, whether the advance timer has attained a given number is checked so that if the given number has been attained, the correction ignition timing is decreased by an amount $\theta_A$ (e.g., $0.5°$ crank angle) and thus the ignition timing is corrected in a direction to advance it.

When $P_m < P_1$, it indicates the nonknocking light load operation so that the advance timer A is reset to zero and also the correction ignition timing is reduced to zero. In this case, the ignition timing $\theta$ becomes equal to the basic ignition timing $\theta_B$ and the maximum advance is provided. The reason for this is to quickly provide the maximum advance under the light load condition and thereby prevent any loss of the engine performance due to retardation of the ignition timing. In this way, the proper ignition timing is computed and the engine is ignited through the ignition and the coil.

We claim:

1. An ignition timing control system with knock control for internal combustion engines, comprising:

a knocking sensor for detecting the occurrence of knocking in an engine and producing signals indicative thereof;

an acceleration sensor for detecting an acceleration condition of said engine and producing signals indicative thereof;

a control unit, responsive to detection signals from said knocking sensor and said acceleration sensor, for retarding ignition timing of said engine by a given retard angle, said control unit determining the presence or absence of knocking in accordance with the signals from said knocking sensor and determining whether present knocking signals exceed a predetermined level thereby constituting heavy knocking, said control unit further determining the presence or absence of acceleration in accordance with the signals from said acceleration sensor and increasing the amount of retard per each determined knocking whenever both heavy knocking and acceleration are determined, but maintaining said given retard angle if either determination has not been made in accordance with the results of said determinations, and said control unit generating a control signal corresponding to the amount of retard; and ignition means for igniting said engine at an ignition timing corresponding to said control signal from said control unit.

2. A system according to claim 1, wherein said control unit is responsive to signals from said knocking sensor to detect the interval between occurrences of knocking and thereby determine the occurrence of heavy knocking when said interval is shorter than a predetermined time interval.

3. A system according to claim 2, wherein said predetermined time interval varies in accordance with operating conditions of said engine.

4. A system according to claim 1, wherein said control unit comprises a knock detecting circuit responsive to detection signals from said knocking sensor to detect the occurrence of knocking, an acceleration detecting circuit responsive to detection signals from said acceleration sensor to detect an acceleration, a retard angle variation circuit responsive to an output of said knock detecting circuit and an output of said acceleration detecting circuit to control and vary the amount of retard in accordance with said outputs, and a retard angle computing circuit responsive to an output of said retard angle variation circuit and the output of said knock detecting circuit to compute a retard angle for controlling the ignition timing of said engine.

5. A system according to claim 4, wherein said knock detecting circuit comprises means for filtering and rectifying the output of said knocking sensor, means for integrating said rectified signal to produce a knock discrimination level, a comparison circuit for generating a signal when the level of said rectified signal is higher than said knock discrimination level, and a monostable circuit responsive to the output signal of said comparison circuit for generating a knock detection signal for a predetermined time.

6. A system according to claim 4, wherein said acceleration detecting circuit comprises a differentiator circuit for differentiating the output of said acceleration sensor, a circuit for generating a signal when the output of said differentiator circuit is greater than a predetermined value, and a monostable circuit responsive to said last-mentioned signal to generate an acceleration detection signal for a predetermined time.

7. A system according to claim 4, wherein said retard angle variation circuit comprises a circuit for generating a first signal for a predetermined time upon the simultaneous reception of the knock detection signal from said knock detecting circuit and the acceleration detection signal from said acceleration detecting circuit, a circuit responsive to said first signal to charge a capacitor with a predetermined first current, operable to discharge said capacitor with a predetermined second current when said first signal is absent and adapted to generate a second signal indicative of a time after the occurrence of knocking when the voltage on said capacitor is higher than a predetermined threshold level, and a circuit for connecting said retard angle computing circuit to a first current source when said second signal is present and to a second current source of a lower current value than the current value of said first current source when said second signal is absent, and wherein said retard angle computing circuit comprises a second capacitor, is responsive to the knock detection signal from said knock detecting circuit to connect said second capacitor to one of said first current source and said second current source and is operable to discharge said second capacitor with a predetermined current thereby generating the voltage on said second capacitor as a retard angle indicative signal.

8. A system according to claim 4, wherein said retard angle variation circuit comprises a circuit for generating a first signal in response to the simultaneous reception of the knock detection signal from said knock detecting circuit and the acceleration detection signal from said acceleration detecting circuit, a circuit responsive to each said first signal to commence the generation of a second signal and stop the generation of said second signal after the completion of a predetermined number of engine cylinder combustion cycles after the generation of said first signal, and a circuit for selectively connecting first and second sources of different currents to said retard angle computing circuit in dependence on the presence and absence, respectively, of said second signal, and wherein said retard angle computing circuit compurises a second capacitor, is responsive to the knock detection signal from said knock detecting circuit to connect said second capacitor to one of said first current source and said second current source and is operable to discharge said second capacitor with a predetermined current when said knock detection signal is absent thereby generating as a retard angle indicative signal the voltage on said second capacitor which is indicative of a voltage corresponding to the frequency of occurrence of knocking and acceleration.

9. A system according to claim 7, wherein said retard angle variation circuit further comprises a circuit for varying said predetermined threshold level in accordance with operating conditions of said engine.

10. A system according to claim 9, wherein said threshold level generating circuit converts the ignition frequency of said engine cylinder to a voltage and thereby generates said threshold level.

11. A system according to claim 1, wherein said control unit comprises:
   a knock detecting circuit responsive to the signals of said knocking sensor to detect the occurrence of knocking; and
   a microcomputer, wherein
   said acceleration sensor comprises an engine rotational angle sensor,
   said microcomputer is responsive to output signals of said rotational angle sensor to detect an acceleration, and
   the amount of retard is varied to generate said control signal in accordance with said knock detecting circuit and said acceleration determination.

12. An ignition timing control system with knocking control for internal combustion engines, comprising:
   a knocking sensor for outputting detection signals indicating the occurrence of knocking in an engine;
   an acceleration sensor for outputting detection signals indicating an accelerating condition of said engine;
   a control unit responsive to detection signals from said knocking sensor and said acceleration sensor to retard the ignition timing of said engine by a given retard angle, said control unit deciding the presence or absence of light knocking and heavy knocking having a knocking level higher than that of the light knocking in accordance with an output signal from said knocking sensor, further deciding the presence or absence of acceleration in accordance with an output signal from said acceleration sensor, setting the amount of retard for each decided present knocking to a first value when the presence of light knocking is decided, and setting the amount of retard for each decided present knocking to a second value, which is greater than the first value, when the presence of heavy knocking and acceleration are respectively and concurrently decided, thereby generating a control signal corresponding to the set amount of retard; and ignition means for igniting said engine at an ignition timing corresponding to the control signal from said control unit.

13. A system according to claim 12, wherein:

said control unit is responsive to the signals from said knocking sensor to detect intensity of said knocking and determine the presence of heavy knocking when said knock intensity is high.

14. A system according to claim 12, wherein said control unit comprises a knock detecting circuit responsive to the detection signal from said knocking sensor to detect the occurrence of knocking, an acceleration detecting circuit responsive to the detection signal from said acceleration sensor to detect an acceleration, a retard angle variation circuit responsive to the output of said knock detecting circuit and the output of said acceleration detecting circuit to control and vary the amount of retard in accordance with said outputs, and a retard angle computing circuit responsive to an output of said retard angle variation circuit and the output of said knock detecting circuit to compute an ignition-timing-controlling retard angle.

15. A system according to claim 13, wherein said acceleration detecting circuit comprises a differentiator circuit for differentiating the output of said acceleration sensor, a circuit for generating a signal when an output of said differentiator circuit is greater than a predetermined value, and a monostable circuit responsive to said last-mentioned signal to generate an acceleration detection signal for a predetermined time.

16. A system according to claim 13, wherein said knock detecting circuit comprises means for filtering and rectifying the output of said knocking sensor, means for integrating said rectified signal, amplifying said integrated signal with a predetermined first amplification factor to produce a first knock discrimination level and amplifying said integrated signal with a predetermined second amplification factor greater than said first amplification factor to produce a second knock discrimination level, a first comparison circuit for generating a signal when the level of said rectified signal is higher than said first discrimination level, a first monostable circuit responsive to the output signal of said first comparison circuit to generate a first knock detection signal for a predetermined time, a second comparison circuit for generating a signal when the level of said rectified signal is higher than said second discrimination level, and a second monostable circuit responsive to the output signal of said second comparison circuit to generate a second knock detection signal for a predetermined time.

17. A system according to claim 16, wherein said retard angle variation circuit connects a current source of a predetermined first current value to said retard angle computing circuit when the acceleration detection signal from said acceleration detecting circuit and said second knock detection signal from said knock detecting circuit are not received simultaneously and connects a current source of a predetermined second current value greater than said first current value to said retard angle computing circuit when said acceleration detection signal and said second knock detection signal are received simultaneously, and wherein said retard angle computing circuit comprises a capacitor, is responsive to the first knock detection signal from said knock detecting circuit to connect said capacitor to said current sources of said retard angle variation circuit and is operable to discharge said capacitor with a predetermined current when said first knock detection signal is absent thereby generating the voltage on said capacitor as a retard angle indicative signal.

18. A system according to claim 12, wherein:

said control unit comprises a knock detecting circuit responsive to the output of said knocking sensor to detect the occurrence of knocking;

said knock detecting circuit comprising means for filtering and rectifying said knocking sensor output, means for integrating and amplifying said rectified signal to produce a knock discrimination signal and means for comparing said knock discrimination level and said rectified output and generating a knock pulse signal when the level of said rectified output is higher than said knock discrimination level, a counter for counting said knock pulse signals, said counter being reset in response to each combustion cycle of an engine cylinder, an encoder for encoding an output of said counter and generating a signal having a lesser number of bits than said counter output; and said system further comprising a microcomputer, wherein said acceleration sensor comprises an engine rotational angle sensor, and wherein said microcomputer is responsive to the output signals of said rotational angle sensor to detect an acceleration and responsive to the output of said encoder to determine the intensity of knocking to thereby vary the amount of retard in accordance with the result of said acceleration detection and said knock intensity, and subsequently generate said control signal.

* * * * *